US012069287B2

(12) United States Patent
Chujoh et al.

(10) Patent No.: US 12,069,287 B2
(45) Date of Patent: Aug. 20, 2024

(54) VIDEO DECODING APPARATUS

(71) Applicant: Sharp Kabushiki Kaisha, Sakai (JP)

(72) Inventors: Takeshi Chujoh, Sakai (JP); Tomoko Aono, Sakai (JP); Tomohiro Ikai, Sakai (JP); Eiichi Sasaki, Sakai (JP); Yukinobu Yasugi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 293 days.

(21) Appl. No.: 17/436,110

(22) PCT Filed: Mar. 6, 2020

(86) PCT No.: PCT/JP2020/009870
§ 371 (c)(1),
(2) Date: Sep. 3, 2021

(87) PCT Pub. No.: WO2020/184487
PCT Pub. Date: Sep. 17, 2020

(65) Prior Publication Data
US 2022/0167002 A1    May 26, 2022

(30) Foreign Application Priority Data
Mar. 8, 2019  (JP) ................ 2019-043097

(51) Int. Cl.
*H04N 19/513*   (2014.01)
*H04N 19/105*   (2014.01)
(Continued)

(52) U.S. Cl.
CPC ......... *H04N 19/513* (2014.11); *H04N 19/105* (2014.11); *H04N 19/172* (2014.11); *H04N 19/46* (2014.11)

(58) Field of Classification Search
CPC .... H04N 19/176; H04N 19/105; H04N 19/70; H04N 19/52; H04N 19/159;
(Continued)

(56) References Cited

U.S. PATENT DOCUMENTS 11,190,797 B2   11/2021   Wang et al.

FOREIGN PATENT DOCUMENTS

WO   2020/113051 A2   6/2020
WO   2020/180685 A1   9/2020

OTHER PUBLICATIONS

Bross et al. ( "Versatile Video Coding (Draft 4)", Joint Video Experts Team (JVET) of ITU-T SG 16 WP 3 and ISO/IEC TC 1/SC 29/WG 11, JVET-M1001-v5, Jan. 9-18, 2019, 15 pages) (Year: 2019).*

(Continued)

*Primary Examiner* — Masum Billah
(74) *Attorney, Agent, or Firm* — Keating & Bennett, LLP

(57) ABSTRACT

An image decoding apparatus and an image coding apparatus that reduce complexity of high image quality processing are implemented. The image decoding apparatus includes an inter prediction parameter decoding processing unit that includes processing of, regarding two motion vectors, modifying the two motion vectors from an error of two prediction images. In a case that neither of the two prediction images is a case of weighted prediction, the processing of modifying the two motion vectors is performed.

8 Claims, 20 Drawing Sheets

(51) Int. Cl.
*H04N 19/172* (2014.01)
*H04N 19/46* (2014.01)

(58) Field of Classification Search
CPC .. H04N 19/132; H04N 19/186; H04N 19/119; H04N 19/577; H04N 19/172; H04N 19/46
USPC .......................................................... 375/240
See application file for complete search history.

(56) References Cited

OTHER PUBLICATIONS

Official Communication issued in International Patent Application No. PCT/JP2020/009870, mailed on Jun. 2, 2020.
Park et al., "Non-CE9: Conditions fix for DMVR and BDOF", Joint Video Experts Team (JVET) of ITU-T SG 16 WP 3 and ISO/IEC JTC 1/SC 29/WG 11, JVET-N0442, Mar. 19-27, 2019, pp. 1-4.
Chen et al., "Non-CE9: Modified enabling condition for DMVR and BDOF", Joint Video Experts Team (JVET) of ITU-T SG 16 WP 3 and ISO/IEC JTC 1/SC 29/WG 11, JVET-N0162-v2, Mar. 19-27, 2019, pp. 1-4.
Unno et al., "CE9-related: Alternative method of SAD based early termination for BDOF", Joint Video Experts Team (JVET) of ITU-T SG 16 WP 3 and ISO/IEC JTC 1/SC 29/WG 11, JVET-N0158-v2, Mar. 19-27, 2019, pp. 1-4.
Chen et al., "CE9-related: Simplification of cascading DMVR and BDOF processes", Joint Video Experts Team (JVET) of ITU-T SG 16 WP 3 and ISO/IEC JTC 1/SC 29/WG 11, JVET-N0097-v1, Mar. 19-27, 2019, pp. 1-3.
Bross et al., "Versatile Video Coding (Draft 4)", Joint Video Experts Team (JVET) of ITU-T SG 16 WP 3 and ISO/IEC JTC 1/SC 29/WG 11, JVET-M1001-v5, Jan. 9-18, 2019, 15 pages.
Su et al., "CE4.4.1: Generalized bi-prediction for inter coding", Joint Video Experts Team (JVET) of ITU-T SG 16 WP 3 and ISO/IEC JTC 1/SC 29/WG 11, JVET-K0248-v1, Jul. 10-18, 2018, 4 pages.

* cited by examiner

VIDEO DECODING APPARATUS

TECHNICAL FIELD

Embodiments of the present invention relate to a video decoding apparatus.

BACKGROUND ART

A video coding apparatus which generates coded data by coding a video, and a video decoding apparatus which generates decoded images by decoding the coded data are used for efficient transmission or recording of videos.

Specific video coding schemes include, for example, H.264/AVC and High-Efficiency Video Coding (HEVC) schemes and the like.

In such a video coding scheme, images (pictures) constituting a video are managed in a hierarchical structure including slices obtained by splitting an image, coding tree units (CTUs) obtained by splitting a slice, units of coding (coding units; which will be referred to as CUs) obtained by splitting a coding tree unit, and transform units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

Further, as a technique of video coding and decoding of recent years, NPL 1 is given.

CITATION LIST

Non Patent Literature

NPL 1: "Versatile Video Coding (Draft 4)", JVET-M1001, Joint Video Exploration Team (JVET) of ITU-T SG 16 WP 3 and ISO/IEC JTC 1/SC 29/WG 11, 2019

SUMMARY OF INVENTION

Technical Problem

In a case that a bi-directional prediction image of NPL 1 is derived, prediction (BDOF prediction) using DMVR processing of modifying motion vectors by using two prediction images to achieve high image quality of prediction images and BDOF processing of achieving high image quality of prediction images by using a gradient image has high complexity in processing, which has been presenting a problem.

Embodiments of the present invention have an object to implement an image decoding apparatus and an image coding apparatus that reduce complexity of the high image quality processings described above.

Solution to Problem

In order to solve the problem described above,
an image decoding apparatus according to an aspect of the present invention includes
an inter prediction parameter decoder including processing of, regarding two motion vectors,
modifying the two motion vectors from an error of two prediction images, wherein
in a case that neither of the two prediction images is a case of weighted prediction, the processing of modifying the two motion vectors is performed.

An image coding apparatus according to an aspect of the present invention includes
an inter prediction parameter coder including processing of, regarding two motion vectors,
modifying the two motion vectors from an error of two prediction images, wherein
in a case that neither of the two prediction images is a case of weighted prediction, the processing of modifying the two motion vectors is performed.

By adopting the configurations as described above, in a case that weighted prediction is applied, error evaluation cannot be correctly performed and an effect cannot thus be obtained, and therefore, by restricting an application condition, the entire amount of processing can be reduced.

An image decoding apparatus according to an aspect of the present invention includes:
an inter prediction parameter decoder including processing of, regarding two motion vectors, modifying the two motion vectors from an error value of two prediction images; and
a bi-directional optical flow sample prediction processing unit configured to generate a prediction image by using a gradient image derived from two generated interpolation images by using a parameter decoded by the inter prediction parameter decoder, wherein
determination as to whether or not processing of the bi-directional optical flow sample prediction processing unit is to be applied is performed by using the error value of the two prediction images.

An image coding apparatus according to an aspect of the present invention includes:
an inter prediction parameter coder including processing of, regarding two motion vectors, modifying the two motion vectors from an error value of two prediction images; and
a bi-directional optical flow sample prediction processing unit configured to generate a prediction image by using a gradient image derived from two generated interpolation images by using a parameter decoded by the inter prediction parameter decoder, wherein
determination as to whether or not processing of the bi-directional optical flow sample prediction processing unit is to be applied is performed by using the error value of the two prediction images.

By adopting the configurations as described above, in order to modify the motion vectors, the error value needs to be calculated, whereas in the bi-directional optical flow sample prediction processing unit, there is no effect in a case that the error is small, and therefore, by adding the processing as described above, determination of application of the processing of the bi-directional optical flow sample prediction processing unit is enabled without addition of an additional error value. As a result, the entire amount of processing can be reduced.

Advantageous Effects of Invention

According to the configurations described above, an image decoding apparatus and an image coding apparatus that reduce complexity of the high image quality processing can be implemented.

DESCRIPTION OF EMBODIMENTS

First Embodiment

Hereinafter, an embodiment of the present invention will be described with reference to the drawings.

Figure 1:
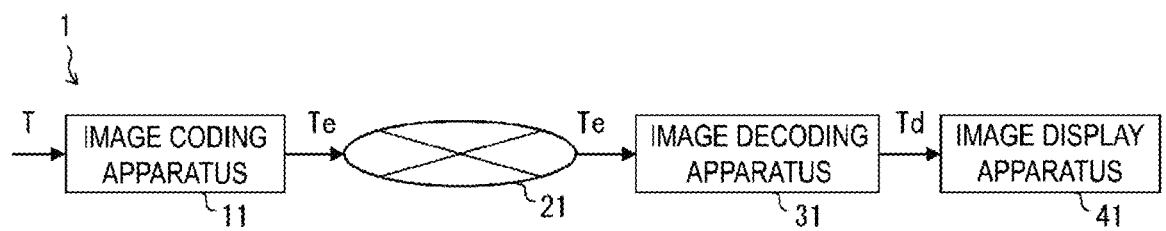
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bi-directional communication network, and may be a unidirectional communication network configured to transmit broadcast waves of digital terrestrial television broadcasting, satellite broadcasting of the like. Furthermore, the network 21 may be substituted by a storage medium in which the coding stream Te is recorded, such as a Digital Versatile Disc (DVD: trade name) or a Blue-ray Disc (BD: trade name).

The video decoding apparatus 31 decodes each of the coding streams Te transmitted from the network 21 and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-luminescence (EL) display. Forms of the display include a stationary type, a mobile type, a Head Mount Display (HMD) type, and the like. In addition, in a case that the video decoding apparatus 31 has a high processing capability, the video display apparatus 41 displays an image having high image quality, and in a case that the video decoding apparatus 31 has only a lower processing capability, the video display apparatus 41 displays an image which does not require high processing capability and display capability.

Operator

Operators used in the present specification will be described below.

$>>$ is a right bit shift, $<<$ is a left bit shift, & is a bitwise AND, | is a bitwise OR, |= is an OR assignment operator, and || indicates a logical sum.

x?y:z is a ternary operator to take y in a case that x is true (other than 0) and take z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs (a) is a function that returns the absolute value of a.

Int (a) is a function that returns the integer value of a.

floor (a) is a function that returns the maximum integer equal to or less than a.

ceil (a) is a function that returns the minimum integer equal to or greater than a.

a/d represents division of a by d (round down decimal places).

sign (a) is a function that returns the sign of a.

a^b represents the b-th power of a.

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
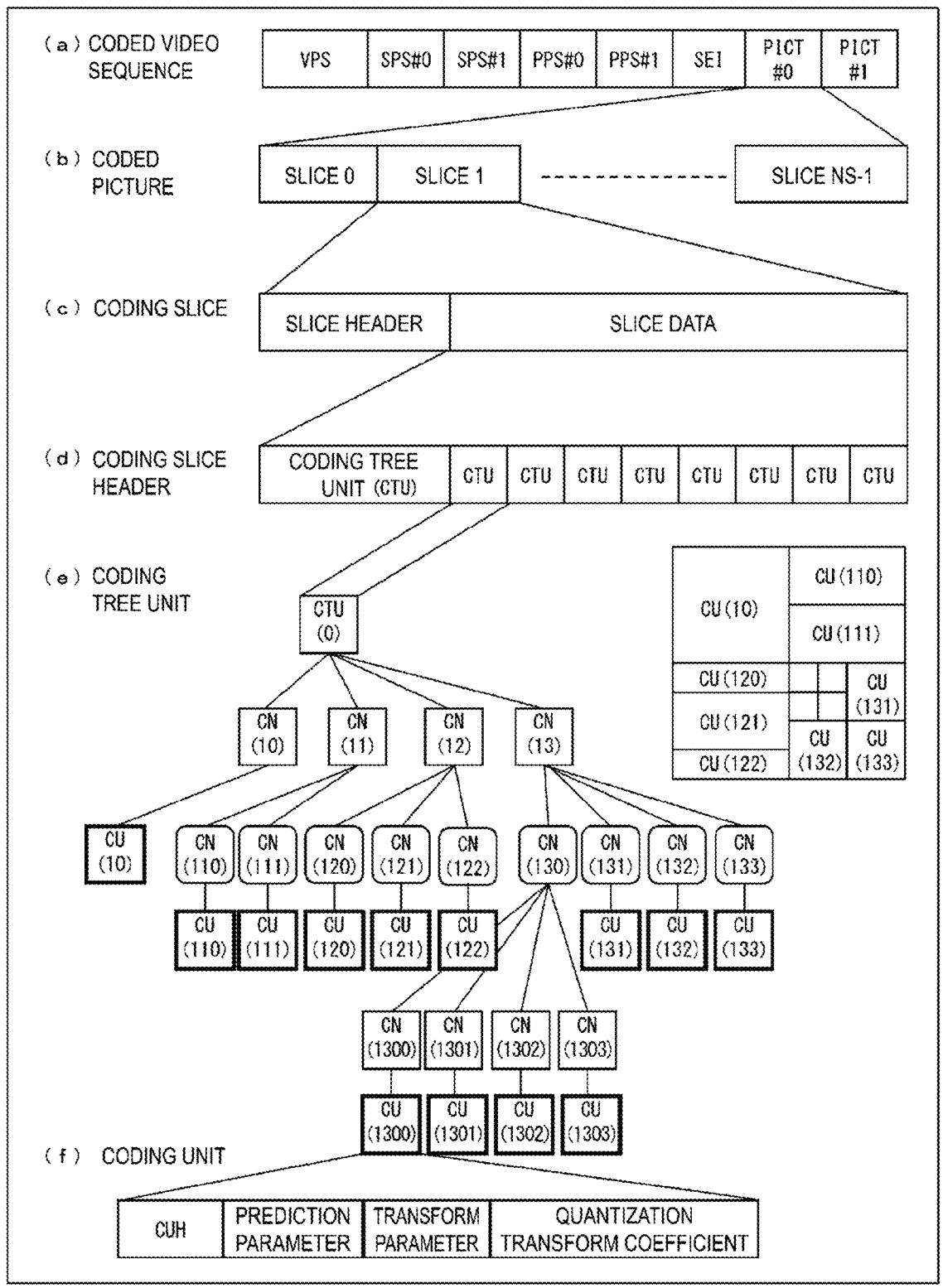
FIG. 4 is a diagram illustrating a hierarchical structure of data of a coding stream.

FIG. 4 is a diagram illustrating a hierarchical structure of data of the coding stream Te. The coding stream Te includes a sequence and multiple pictures constituting the sequence illustratively. (a) to (f) of FIG. 4 are diagrams illustrating a coded video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit, respectively.

Coded Video Sequence

In the coded video sequence, a set of data referred to by the video decoding apparatus 31 to decode the sequence SEQ to be processed is defined. As illustrated in FIG. 4(a), the sequence SEQ includes a Video Parameter Set, a Sequence Parameter Set SPS, a Picture Parameter Set PPS, a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the video decoding apparatus 31 to decode a target sequence is defined. For example, a width and a height of a picture are defined. Note that multiple SPSs may exist. In that case, any of the multiple SPSs is selected from the PPS.

In the picture parameter set PPS, a set of coding parameters referred to by the video decoding apparatus 31 to decode each picture in a target sequence is defined. For example, a reference value (pic_init_qp_minus26) of a quantization step size used for decoding of a picture and a flag (weighted_pred_flag) indicating an application of a weighted prediction are included. Note that multiple PPSs may exist. In that case, any of the multiple PPSs is selected from each picture in a target sequence.

Coded Picture

In the coded picture, a set of data referred to by the video decoding apparatus 31 to decode the picture PICT to be processed is defined. As illustrated in FIG. 4(b), the picture PICT includes a slice 0 to a slice NS-1 (NS is the total number of slices included in the picture PICT).

Note that in a case that it is not necessary to distinguish each of the slice 0 to the slice NS-1 below, subscripts of reference signs may be omitted. In addition, the same applies to other data with subscripts included in the coding stream Te which will be described below.

Coding Slice

In the coding slice, a set of data referred to by the video decoding apparatus 31 to decode the slice S to be processed is defined. As illustrated in FIG. 4(c), the slice includes a slice header and a slice data.

The slice header includes a coding parameter group referred to by the video decoding apparatus 31 to determine a decoding method for a target slice. Slice type specification information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bi-directional prediction, or an intra prediction in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referred to by the video decoding apparatus 31 to decode the slice data to be processed is defined. The slice data includes a CTU as illustrated in FIG. 4(d). The CTU is a block of a fixed size (for example, 64×64) constituting a slice, and may be called a Largest Coding Unit (LCU).

Coding Tree Unit

In FIG. 4(e), a set of data referred to by the video decoding apparatus 31 to decode the CTU to be processed is defined. The CTU is split into coding unit CUs, each of which is a basic unit of coding processing, by a recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

The CT includes, as CT information, a QT split flag (qt_split_cu_flag) indicating whether or not to perform a QT split, an MT split flag (mtt_split_cu_flag) indicating the presence or absence of an MT split, an MT split direction (mtt_split_cu_vertical_flag) indicating a split direction of an MT split, and an MT split type (mtt_split_cu_binary_flage) indicating a split type of the MT split. qt_split_cu_flag, mtt_split_cu_flag, mtt_split_cu_vertical_flag, and mtt_split_cu_binary_flag are transmitted for each coding node.

Figure 5:
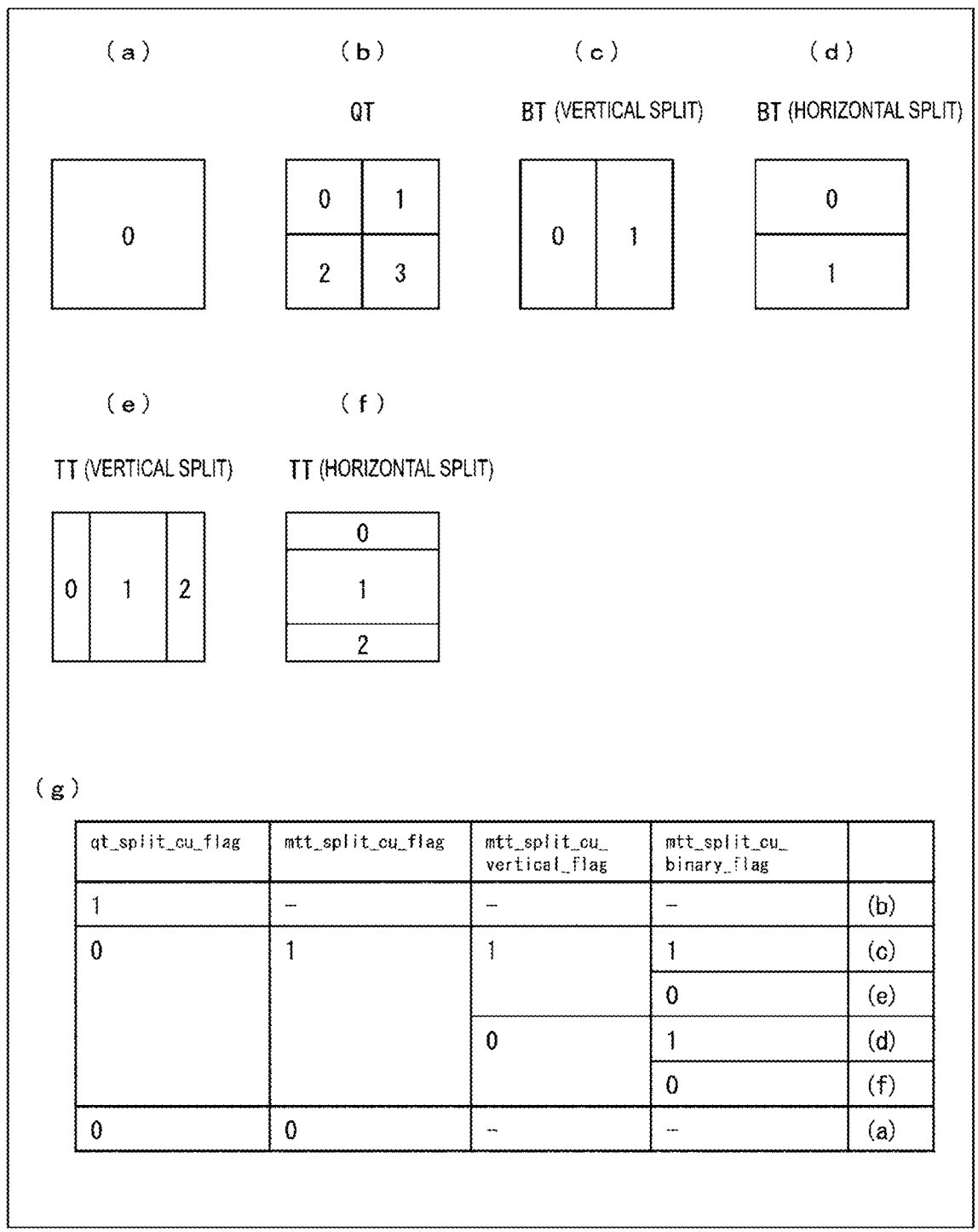
FIG. 5 is a diagram illustrating a split example of a CTU.

FIG. 5 is a diagram illustrating an example of splitting of a CTU. In a case that qt_split_cu_flag is 1, the coding node is split into four coding nodes (FIG. 5(b)).

In a case that qt_split_cu_flag is 0, the coding node is not split and has one CU as a node in a case that mtt_split_cu_flag is 0 (FIG. 5(a)). The CU is an end node of the coding nodes and is not split any further. The CU is a basic unit of coding processing.

In a case that mtt_split_cu_flag is 1, the coding node is subjected to the MT split as described below. In a case that the mtt_split_cu_vertical_flag is 0 and the mtt_split_cu_binary_flag is 1, the coding node is horizontally split into two coding nodes (FIG. 5(d)). In a case that the mtt_split_cu_vertical_flag is 1 and the mtt_split_cu_binary_flag is 1, the coding node is vertically split into two coding nodes (FIG. 5(c)). Additionally, in a case that the mtt_split_cu_vertical_flag is 0 and the mtt_split_cu_binary_flag is 0, the coding node is horizontally split into three coding nodes (FIG. 5(f)). In a case that the mtt_split_cu_vertical_flag is 1 and the mtt_split_cu_binary_flag is 0, the coding node is vertically split into three coding nodes (FIG. 5(e)). These are illustrated in FIG. 5(g).

Furthermore, in a case that a size of the CTU is 64×64 pixels, a size of the CU may take any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in FIG. 4(f), in the CU, a set of data referred to by the video decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are defined.

There are cases that the prediction processing is performed in units of CU or performed in units of sub-CU in which the CU is further split. In a case that the sizes of the CU and the sub-CU are equal to each other, the number of sub-CUs in the CU is one. In a case that the CU is larger in size than the sub-CU, the CU is split into sub-CUs. For example, in a case that the CU has a size of 8×8, and the sub-CU has a size of 4×4, the CU is split into four sub-CUs which include two horizontal splits and two vertical splits.

There are two types of predictions (prediction modes), which are intra prediction and inter prediction. The intra prediction refers to a prediction in an identical picture, and the inter prediction refers to prediction processing performed between different pictures (for example, between pictures of different display times).

Transform and quantization processing is performed in units of CU, but the quantization transform coefficient may be subjected to entropy coding in units of sub-block such as 4×4.

Prediction Parameter

A prediction image is derived by a prediction parameter accompanying a block. The prediction parameter includes prediction parameters of the intra prediction and the inter prediction.

The prediction parameter of the inter prediction will be described below. The inter prediction parameter includes prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list are used for inter prediction, respectively, and a corresponding reference picture list is used for inter prediction in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

For example, syntax elements to derive inter prediction parameters include an affine flag affine_flag, a merge flag merge_flag, a merge index merge_idx, an inter prediction indicator inter_pred_idc, a reference picture index refIdxLX, a prediction vector index mvp_LX_idx, a difference vector mvdLX, and an adaptive motion vector resolution mode amvr_mode.

Reference Picture List

Figure 6:
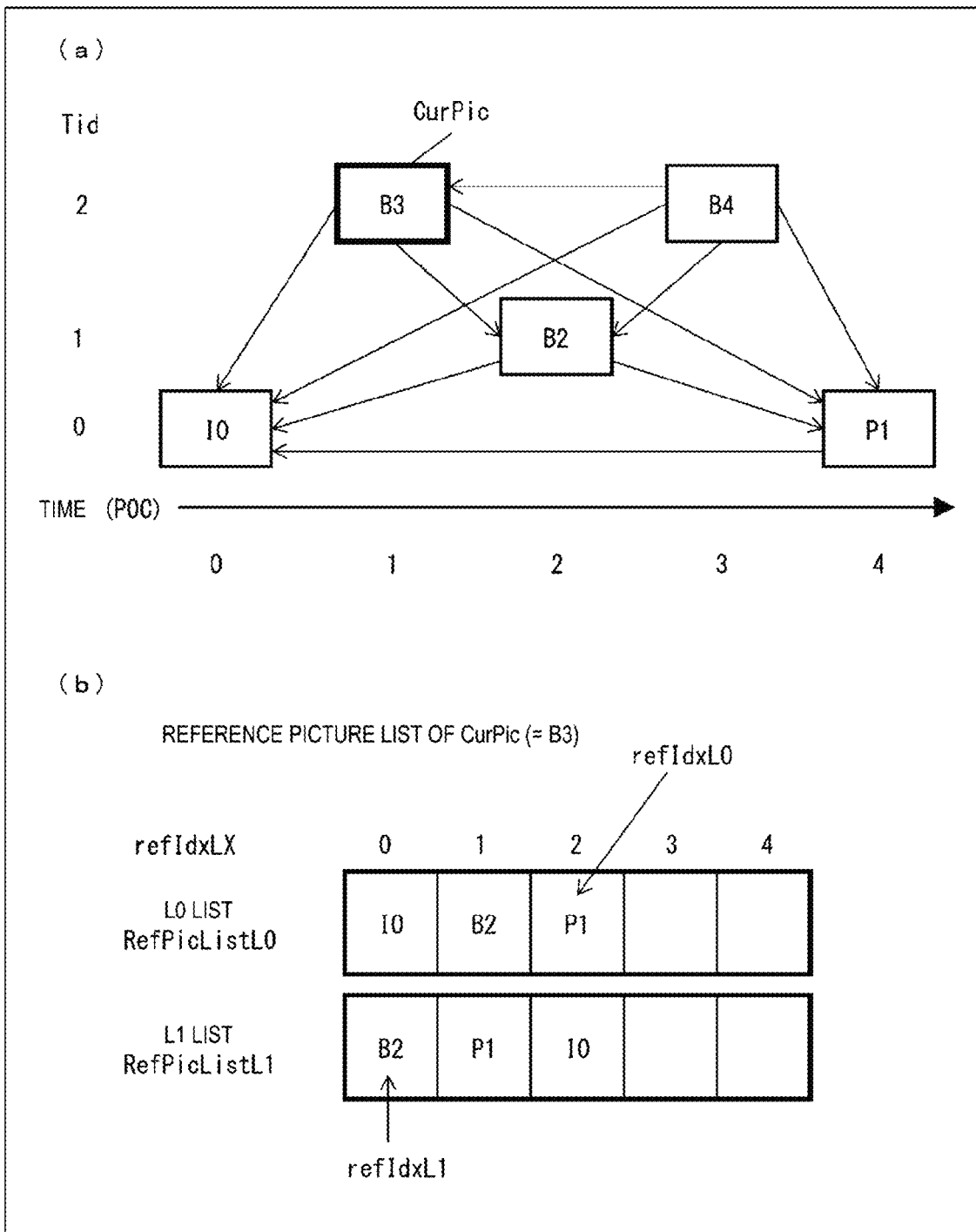
FIG. 6 is a conceptual diagram illustrating an example of reference pictures and reference picture lists.

A reference picture list is a list constituted by reference pictures stored in a reference picture memory 306. FIG. 6 is a conceptual diagram illustrating an example of reference pictures and reference picture lists. In FIG. 6(a), a rectangle indicates a picture, an arrow indicates a reference relationship of a picture, a horizontal axis indicates time, each of I, P, and B in a rectangle indicates an intra-picture, a uni-prediction picture, a bi-prediction picture, and a number in a rectangle indicates a decoding order. As illustrated, the decoding order of the pictures is I0, P1, B2, B3, and B4, and the display order is I0, B3, B2, B4, and P1. FIG. 6(b) illustrates an example of reference picture lists of picture B3 (target picture). The reference picture list is a list to represent a candidate of a reference picture, and one picture (slice) may include one or more reference picture lists. In the illustrated example, the target picture B3 includes two reference picture lists, i.e., an L0 list RefPicList0 and an L1 list RefPicList1. For an individual CU, which picture in a reference picture list RefPicListX (X=0 or 1) is actually referred to is specified with the reference picture index refIdxLX. The diagram illustrates an example of refIdxL0=2, refIdxL1=0. Note that LX is a description method used in a case of not distinguishing an L0 prediction and an L1 prediction, and in the following description, distinguishes parameters for the L0 list and parameters for the L1 list by replacing LX with L0 and L1.

Merge Prediction and AMVP Prediction

A decoding (coding) method for prediction parameters include a merge prediction (merge) mode and an Advanced Motion Vector Prediction (AMVP) mode, and the merge flag merge_flag is a flag to identify the modes. The merge prediction mode is a mode to derive from prediction parameters of neighboring blocks already processed without including a prediction list utilization flag predFlagLX (or inter prediction indicator inter_pred_idc), the reference picture index refIdxLX, and a motion vector mvLX in coded data. The AMVP mode is a mode in which the inter prediction indicator inter_pred_idc, the reference picture index refIdxLX, and the motion vector mvLX are included in coded data. Note that, the motion vector mvLX is coded as the prediction vector index mvp_LX_idx identifying a prediction vector mvpLX, the difference vector mvdLX, and the adaptive motion vector resolution mode amvr_mode. The merge prediction mode is a mode in which a merge candidate derived from motion information and the like of the neighboring block is selected to obtain a motion vector mvLX (motion vector information). Furthermore, in addition to the merge prediction mode, an affine prediction mode identified by an affine flag affine_flag may be provided. As one form of the merge prediction mode, a skip mode identified by the skip flag skip_flag may be provided. Note that the skip mode is a mode to derive and use the prediction parameter as is the case with the merge mode and in which the prediction error (residual image, residual information) is not included in the coded data. In other words, in a case that skip flag skip_flag is 1, for the target CU, the coded data includes only the syntax associated with the merge mode such as the skip flag skip_flag and the merge index merge_idx, and no motion vectors, residual information, or the like.

Motion Vector

The motion vector mvLX indicates a shift amount between blocks in two different pictures. A prediction vector and a difference vector related to the motion vector mvLX is referred to as a prediction vector mvpLX and a difference vector mvdLX respectively.

Inter Prediction Indicator inter_pred_idc and Prediction List Utilization Flag predFlagLX The inter prediction indicator inter_pred_idc is a value indicating types and the number of reference pictures, and takes any value of PRED_L0, PRED_L1 and PRED_BI. PRED_L0 and PRED_L1 indicate uni-predictions which use one reference picture managed in the L0 list and one reference picture managed in the L1 list, respectively. PRED_BI indicates a bi-prediction BiPred which uses two reference pictures managed in the L0 list and the L1 list.

The merge index merge_idx is an index to indicate which prediction parameter is used as a prediction parameter of a target block among prediction parameter candidates (merge candidates) derived from blocks of which the processing is completed.

A relationship between the inter prediction indicator inter_pred_idc and prediction list utilization flags predFlagL0 and predFlagL1 are as follows, and those can be converted mutually.

inter_pred_idc=(predFlagL1<<1)+predFlagL0
predFlagL0=inter_pred_idc & 1
predFlagL1=inter_pred_idc>>1

Determination of Bi-Prediction biPred

A flag biPred of whether or not to be the bi-prediction BiPred can be derived from whether or not two prediction list utilization flags are both 1. For example, the derivation can be performed by the following equation.

biPred=(predFlagL0==1&&predFlagL1==1)

Alternatively, the flag biPred can be also derived from whether the inter prediction indicator is a value indicating to use two prediction lists (reference pictures). For example, the derivation can be performed by the following equation.

biPred=(inter_pred_idc==PRED_BI)?1:0

Configuration of Video Decoding Apparatus

Figure 7:
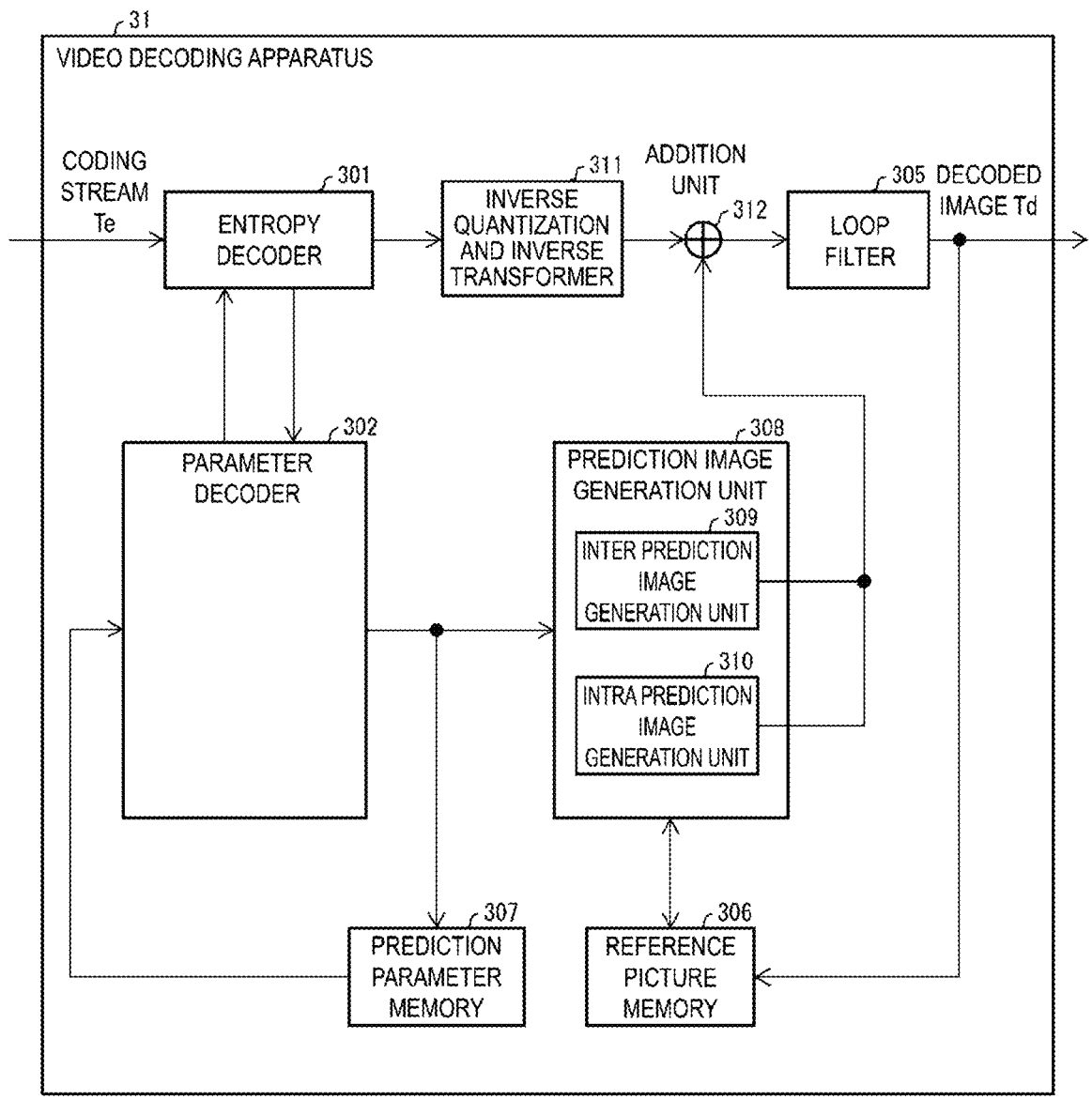
FIG. 7 is a schematic diagram illustrating a configuration of a video decoding apparatus.

The configuration of the video decoding apparatus 31 (FIG. 7) according to the present embodiment will be described.

The video decoding apparatus 31 includes an entropy decoder 301, a parameter decoder 302, a loop filter 305, the reference picture memory 306, a prediction parameter memory 307, a prediction image generation unit (prediction image generation device) 308, an inverse quantization and inverse transformer 311, and an addition unit 312. Note that a configuration in which the loop filter 305 is not included in the video decoding apparatus 31 may be used in accordance with the video coding apparatus 11 described later.

The parameter decoder 302 further includes a header decoder 3020, a CT information decoder 3021, and a CU decoder 3022 (prediction mode decoder), which are not illustrated, and the CU decoder 3022 further includes a TU decoder 3024. These may be collectively referred to as a decoding module. The header decoder 3020 decodes, from coded data, parameter set information such as the VPS, the SPS, and the PPS, and a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and quantization prediction error (residual_coding) from coded data.

In the mode other than the skip mode (skip_mode==0), the TU decoder 3024 decodes QP update information (quantization correction value) and quantization prediction error (residual_coding) from coded data. More specifically, the TU decoder 3024 decodes, in a case of skip_mode==0, a flag cu_cbp indicating whether a quantization prediction error is included in the target block is decoded from the coded data, and decodes the quantization prediction error in a case that cu_cbp is 1. In a case that cu_cbp is not present in the coded data, the TU decoder 3024 derives cu_cbp as 0.

The parameter decoder 302 includes an inter prediction parameter decoder 303 and an intra prediction parameter decoder 304 (not illustrated). The prediction image generation unit 308 includes an inter prediction image generation unit 309 and an intra prediction image generation unit 310.

Furthermore, an example in which a CTU and a CU are used as units of processing is described below, but the processing is not limited to this example, and processing in units of sub-CU may be performed. Alternatively, the CTU and the CU may be replaced with a block, the sub-CU may be replaced with by a sub-block, and processing may be performed in units of blocks or sub-blocks.

The entropy decoder 301 performs entropy decoding on the coding stream Te input from the outside and separates and decodes individual signs (syntax elements). The decoded signs include prediction information to generate a prediction image, a prediction error to generate a difference image, and the like.

The entropy decoder 301 outputs the decoded signs to the parameter decoder 302. The decoded sign is, for example, predMode, merge_flag, merge_idx, inter_pred_idc, refIdxLX, mVP_Lx_idx, mvdLX, amvr_mode, and the like. Which sign is to be decoded is controlled based on an indication of the parameter decoder 302.

Configuration of Inter Prediction Parameter Decoder

The inter prediction parameter decoder 303 decodes an inter prediction parameter with reference to a prediction parameter stored in the prediction parameter memory 307, based on a sign input from the entropy decoder 301. Furthermore, the inter prediction parameter decoder 303 outputs the decoded inter prediction parameter to the prediction image generation unit 308, and stores the decoded inter prediction parameter in the prediction parameter memory 307.

Figure 8:
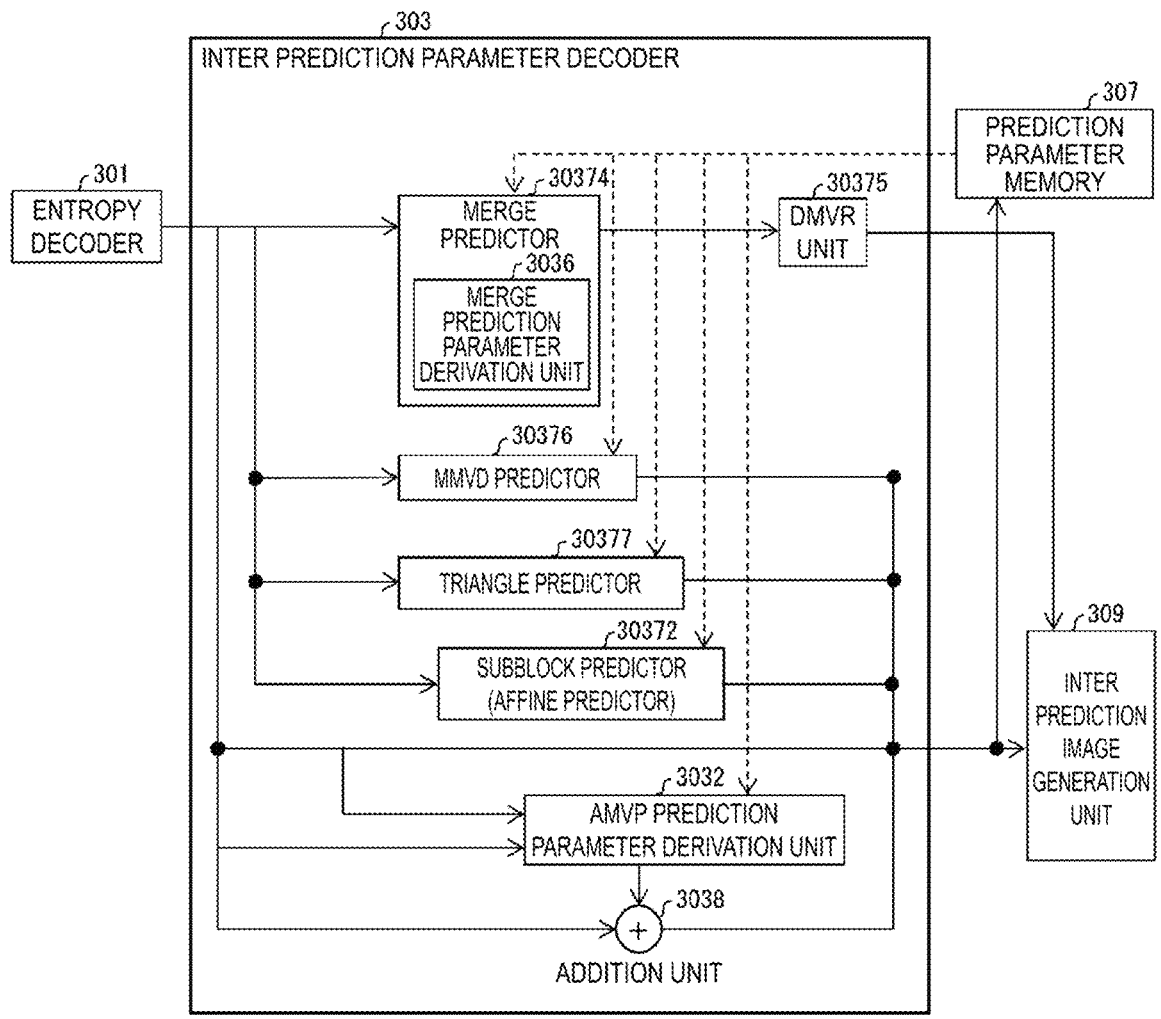
FIG. 8 is a schematic diagram illustrating a configuration of an inter prediction parameter decoder.

FIG. 8 is a schematic diagram illustrating a configuration of the inter prediction parameter decoder 303 according to the present embodiment. The inter prediction parameter decoder 303 includes a merge predictor 30374, a DMVR unit 30375, a subblock predictor (affine predictor) 30372, an MMVD predictor 30376, a Triangle predictor 30377, an AMVP prediction parameter derivation unit 3032, and an addition unit 3038. The merge predictor 30374 includes a merge prediction parameter derivation unit 3036. The AMVP prediction parameter derivation unit 3032, the merge prediction parameter derivation unit 3036, and the affine predictor 30372 are means shared by the video coding apparatus and the video decoding apparatus, and may thus be collectively referred to as a motion vector derivation unit (motion vector derivation apparatus).

Affine Predictor

The affine predictor 30372 derives an affine prediction parameter of a target block. In the present embodiment, as the affine prediction parameter, motion vectors (mv0_x, mv0_y) and (mv1_x, mv1_y) of the two control points (V0, V1) of the target block are derived. Specifically, the motion vector of each control point may be derived by prediction from a motion vector of a neighboring block of the target block, or the motion vector of each control point may be derived by the sum of the prediction vector derived as the motion vector of the control point and the difference vector derived from coded data.

Merge Prediction

Figure 9:
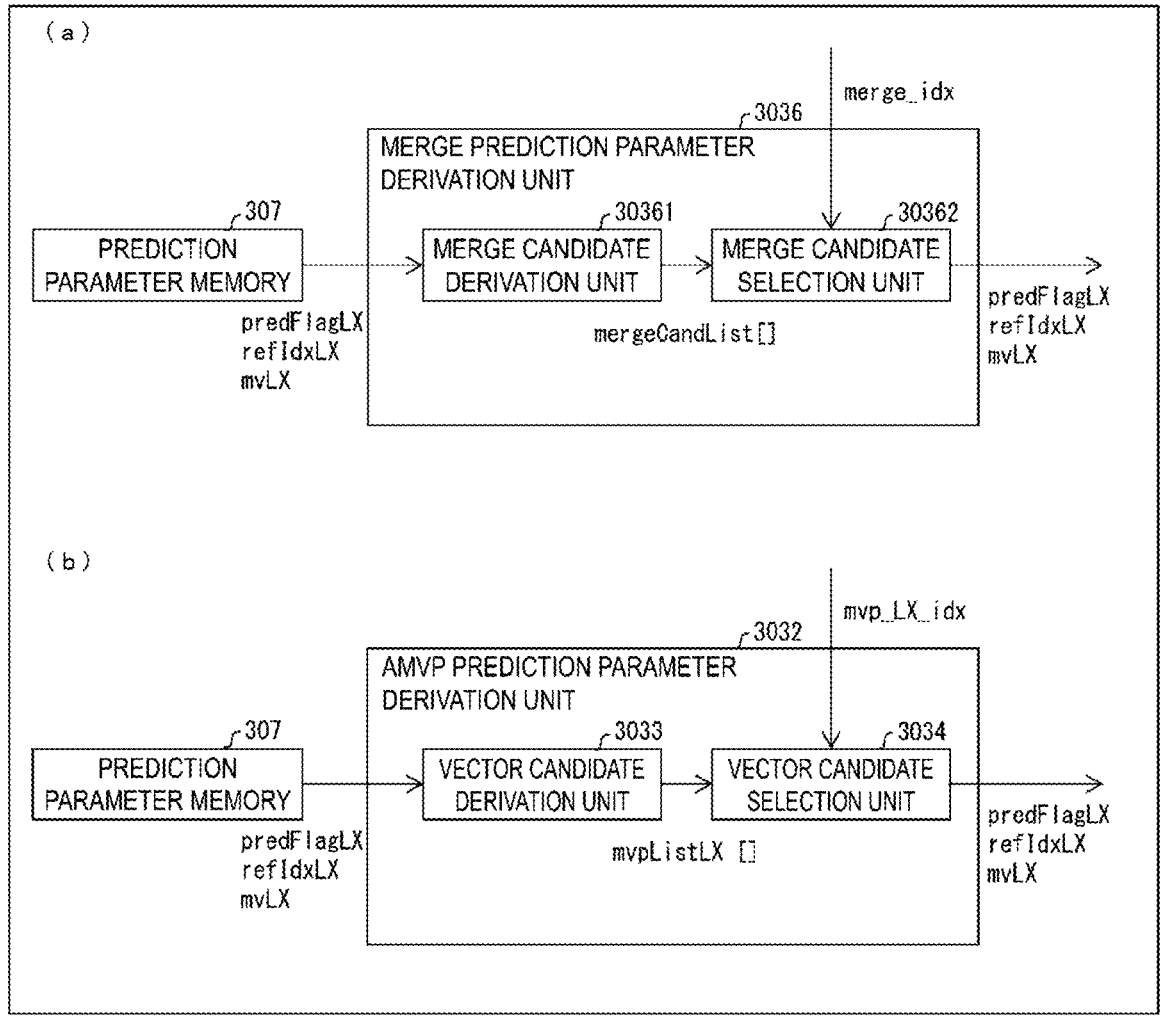
FIG. 9 is a schematic diagram illustrating configurations of a merge prediction parameter derivation unit and an AMVP prediction parameter derivation unit.

FIG. 9(a) is a schematic diagram illustrating a configuration of the merge prediction parameter derivation unit 3036 included in the merge predictor 30374. The merge prediction parameter derivation unit 3036 includes a merge candidate derivation unit 30361 and a merge candidate selection unit 30362. Note that the merge candidates include the prediction list utilization flag predFlagLX, the motion vector mvLX, and the reference picture index refIdxLX, and is stored in the merge candidate list. The merge candidate stored in the merge candidate list is assigned an index in accordance with a prescribed rule.

The merge candidate derivation unit 30361 derives the merge candidate using a motion vector of a decoded neighboring block and the reference picture index refIdxLX as is.

The order of storing in the merge candidate list mergeCandList[ ] is, for example, spatial merge candidates A1, B1, B0, A0, B2, a temporal merge candidate Col, a pair-wise merge candidate avgK, and a zero merge candidate ZK. Note that a reference block that is not available (intra prediction block, or the like) is not stored in the merge candidate list.

The merge candidate selection unit 30362 selects a merge candidate N indicated by a merge index merge_idx from the merge candidates included in the merge candidate list, in accordance with the equation below.

$$N = \text{mergeCandList[merge\_idx]}$$

Here, N is a label indicating a merge candidate, and takes A1, B1, B0, A0, B2, Col, avgK, ZK, and the like. The motion information of the merge candidate indicated by the label N is indicated by (mvLXN [0], mvLXN [1]), predFlagLXN, refIdxLXN.

The merge candidate selection unit 30362 selects the motion information (mvLXN [0], mvLXN [1]), predFlagLXN, and refIdxLXN of the selected merge candidate as inter prediction parameters of the target block. The merge candidate selection unit 30362 stores the inter prediction parameters for the selected merge candidate in the prediction parameter memory 307 and outputs the inter prediction parameters to the prediction image generation unit 308.

AMVP Prediction

FIG. 9(b) is a schematic diagram illustrating the configuration of the AMVP prediction parameter derivation unit 3032 according to the present embodiment. The AMVP prediction parameter derivation unit 3032 includes a vector candidate derivation unit 3033 and a vector candidate selection unit 3034. The vector candidate derivation unit 3033 derives a prediction vector candidate from a motion vector mvLX of a decoded neighboring block stored in the prediction parameter memory 307 based on the reference picture index refIdxLX, and stores the result in a prediction vector candidate list mvpListLX[ ].

The vector candidate selection unit 3034 selects, among the prediction vector candidates of the prediction vector candidate list mvpListLX[ ], a motion vector mvpListLX [mvp_LX_idx] indicated by the prediction vector index mvp_LX_idx, as a prediction vector mvpLX. The vector candidate selection unit 3034 outputs the selected prediction vector mvpLX to the addition unit 3038.

Note that the prediction vector candidate is derived by scaling a motion vector of a decoded neighboring block in a predetermined range from the target block. Note that the neighboring blocks include blocks that are spatially adjacent to the target block, such as a left block and an upper block, for example, and also regions temporally adjacent to the target block, e.g., regions obtained from prediction parameters for blocks including the same location as that of the target block but different display times.

The addition unit 3038 adds the prediction vector mvpLX input from the AMVP prediction parameter derivation unit 3032 and the decoded difference vector mvdLX, and calculates the motion vector mvLX. The addition unit 3038 outputs the calculated motion vector mvLX to the prediction image generation unit 308 and the prediction parameter memory 307.

$$\text{mvLX[0]} = \text{mvpLX[0]} + \text{mvdLX[0]}$$

$$\text{mvLX[1]} = \text{mvpLX[1]} + \text{mvdLX[1]}$$

The adaptive motion vector resolution mode amvr_mode is a syntax that switches the accuracy of the motion vector derived in the AMVP mode. For example, in amvr_mode=0, 1, 2, ¼ pixel, 1 pixel, and 4 pixel accuracies are switched.

In a case that the accuracy of motion vectors is 1/16 (MVPREC=16), the parameter decoder 302 may perform inverse quantization by using MvShift (=1<<amvr_mode) derived from amvr_mode as described below, in order to change the motion vector difference with a ¼, 1, or 4 pixel accuracy to a motion vector difference with a 1/16 pixel accuracy.

$$\text{mvdLX[0]} = \text{mvdLX[0]} << (\text{MvShift}+2)$$

$$\text{mvdLX[1]} = \text{mvdLX[1]} << (\text{MvShift}+2)$$

Furthermore, the parameter decoder 302 may decode and derive mvdLX[ ] not subjected yet to shifting by MvShift described above, by decoding the syntax below.

abs_mvd_greater0_flag
abs_mvd_minus2
mvd_sign_flag

Then, the parameter decoder 302 decodes the difference vector lMvd[ ] from the syntax by using the equation below.

$$\text{lMvd[compIdx]} = \text{abs\_mvd\_greater0\_flag[compIdx]} * \\ (\text{abs\_mvd\_minus2[compIdx]}+2) * (1 - \\ 2*\text{mvd\_sign\_flag[compIdx]})$$

In addition, the parameter decoder 302 sets the decoded difference vector lMvd[ ] equal to MvdLX in a case of translational MVD (MotionModelIdc[x][y]==0), and sets the decoded difference vector lMvd[ ] equal to MvdCpLX in a case of a control point MVD (MotionModelIdc[x][y]!=0).

if (MotionModelIdc[x][y]==0)

$$\text{mvdLX}[x0][y0][\text{compIdx}] = \text{lMvd[compIdx]}$$

else $$\text{mvdCpLX}[x0][y0][\text{compIdx}] = \text{lMvd[compIdx]} << 2$$

Motion Vector Scaling

A derivation method for the scaling of a motion vector will be described. Assuming that a motion vector is Mv (reference motion vector), a picture including a block with an Mv is PicMv, a reference picture for the Mv is PicMvRef, a motion vector subjected to scaling is sMv, a picture including a block with an sMv is CurPic, a reference picture referenced by sMv is CurPicRef, a derivation function MvScale (Mv, PicMv, PicMvRef, CurPic, CurPicRef) for the sMv is represented by the following equation.

$$\text{sMv} = \text{MvScale}(\text{Mv}, \text{PicMv}, \text{PicMvRef}, \text{CurPic}, \text{CurPicRef}) = \text{Clip3}(-R1, R1-1, \text{sign} \\ (\text{distScaleFactor}*\text{Mv})*((\text{abs} \\ (\text{distScaleFactor}*\text{Mv})+\text{round1}-1)>>\text{shift1}))$$

$$\text{distScaleFactor} = \text{Clip3}(-R2, R2-1, (\text{tb}*\text{tx}+ \\ \text{round2})>>\text{shift2})$$

$$\text{tx} = (16384+\text{abs}(\text{td})>>1)/\text{td}$$

$$\text{td} = \text{DiffPicOrderCnt}(\text{PicMv}, \text{PicMvRef})$$

$$\text{tb} = \text{DiffPicOrderCnt}(\text{CurPic}, \text{CurPicRef})$$

Here, the round1, round2, shift1, and shift2 are round values and shift values for division using reciprocal, such as, for example, round1=1<<(shift1-1), round2=1<<(shift2-1), shift1=8, shift2=6, etc. DiffPicOrderCnt (Pic1, Pic2) is a function that returns the difference in time information (e.g., POC) between Pic1 and Pic2. For example, R1 and R2 are used to limit the range of values for performing the processing with limited accuracy, and, for example, R1=32768, R2=4096, and the like.

Additionally, the scaling function MvScale (Mv, PicMv, PicMvRef, CurPic, CurPicRef) may be expressed by the equation below.

MvScale(Mv,PicMv,PicMvRef,CurPic,CurPicRef)=
Mv*DiffPicOrderCnt(CurPic,CurPicRef)/DiffPicOrderCnt(PicMv,PicMvRef)

That is, the Mv may be scaled according to the ratio between the difference in time information between CurPic and CurPicRef and the difference in time information between PicMv and PicMvRef.

DMVR Unit 30375

Now, a Decoder side Motion Vector Refinement (DMVR) processing performed by the DMVR unit 30375 will be described. The DMVR processing is processing in which the motion vectors mvL0 and mvL1 are modified by using two reference pictures.

Figure 10:
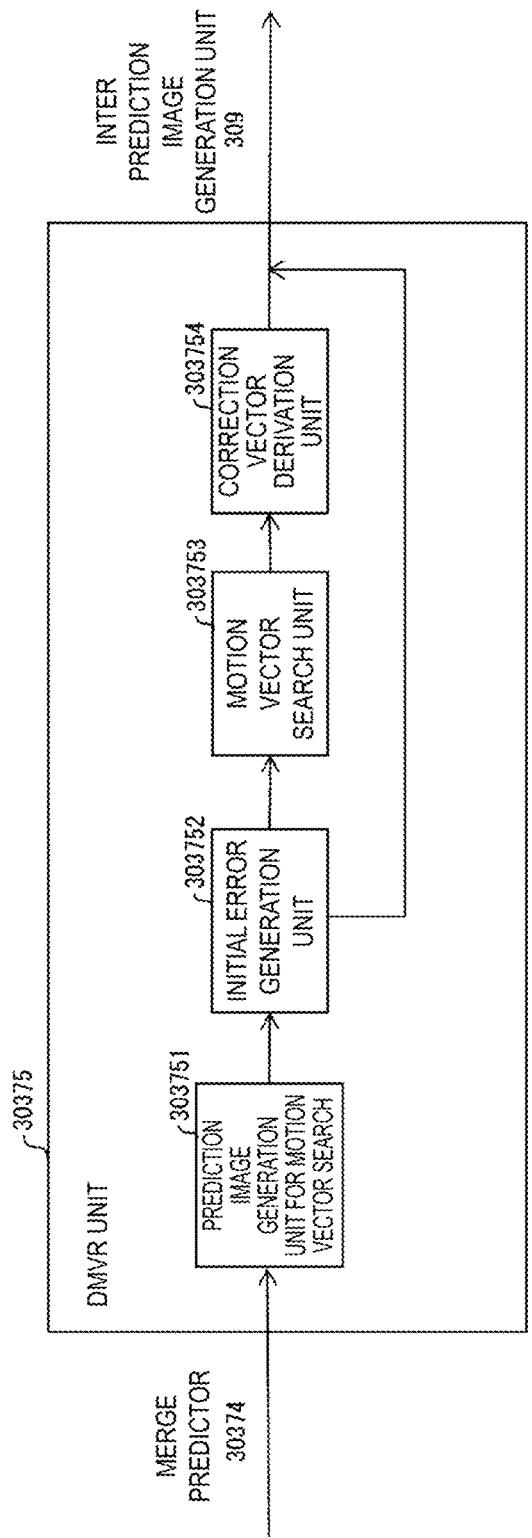
FIG. 10 is a schematic diagram illustrating a configuration of a DMVR unit.

FIG. 10 is a schematic diagram illustrating a configuration of the DMVR unit 30375. With reference to FIG. 10, specific details of processing performed by the DMVR unit 30375 will be described. The DMVR unit 30375 includes a prediction image generation unit 303751 for modification motion vector search, an initial error generation unit 303752, a motion vector search unit 303753, and a modified vector derivation unit 303754.

The DMVR unit 30375 refers to the following from the merge predictor 30374.

Top left position (xCb, yCb) of the target block
Width bW of the target block
Height bH of the target block
Motion vectors mvL0 and mvL1 of 1/16 pixel accuracy
Reference pictures refPicL0L and refPicL1L Then, the DMVR unit 30375 derives change amounts dmvL0 and dmvL1 of the motion vectors for modifying mvL0 and mvL1, and outputs the change amounts dmvL0 and dmvL1 to the inter prediction image generation unit 309.

First, the prediction image generation unit 303751 for modification motion vector search refers to the following.

Top left position (xSb, ySb) of the target subblock
Width sbW of the target subblock of luminance
Height sbH of the target subblock of luminance
Motion vector mvLX (X=0, 1)
Reference picture refPicLXL (X=0, 1)

Then, the prediction image generation unit 303751 for modification motion vector search derives a prediction image predSamplesLXL having a size of (sbW)*(sbH).

In the prediction image generation unit 303751 for modification motion vector search, a motion vector MvLsX (X=0, 1) is derived using the following equation.

MvLsX[0]=MvLX[0]−32

MvLsX[1]=MvLX[1]−32

Further, the DMVR unit 30375 sets each of values of variables srRange, offsetH[0], offsetV[0], offsetH[1], and offsetV[1] equal to 2.

The positions of the pixels in the unit of an integer pixel of a reference block corresponding to pixel positions (xL, yL) in the target block are represented by (xIntL, yIntL). Further, offset in the unit of 1/16 pixel from (xIntL, yIntL) is represented by (xFracL, yFracL). These coordinates are derived from an integer component (mvLX[0]>>4, mvLX[1]>>4) and a fractional component (mvLX[0]& 15, mvLX [1] & 15) of a motion vector (mvLX[0], mvLX[1]), and indicates the position of the pixel with fractional accuracy in the reference picture refPicLXL. Regarding the pixel whose position in predSamplesLXL is (xL, yL) (xL=0, . . . , sbW−1, yL=0, sbH−1), the DMVR unit 30375 derives xIntL, yIntL, xFracL, and yFracL using the following equations.

xIntL=xSb+(mvLX[0]>>4)+xL yIntL=ySb+(mvLX[1]>>4)+yL xFracL=mvLX[0]&15 yFracL=mvLX[1]&15

Subsequently, the DMVR unit 30375 refers to the following.

(xIntL, yIntL)
(xFracL, yFracL)
refPicLXL

Then, the DMVR unit 30375 derives predSamplesLXL.

First, the prediction image generation unit 303751 for modification motion vector search derives variables shift1, shift2, shift3, and shift4 by using the following equations.

shift1=BitDepthY−6 offset1=1<<(shift1−1)

shift2=4 offset2=8 shift3=10−BitDepthY offset3=1<<(shift3−1)

shift4=BitDepthY−10

Note that, in the equations above, BitDepthY is the number of pixel bits.

Next, the prediction image generation unit 303751 for modification motion vector search sets picW equal to a value of a width pic_width_in_luma_samples of the picture. Further, the prediction image generation unit 303751 for modification motion vector search sets picH equal to a value of a height pic_height_in_luma_samples of the picture.

Subsequently, in the prediction image generation unit 303751 for modification motion vector search, predSamplesLXL is derived as follows. In the following description, $fb_L[p]$ indicates a filter coefficient for deriving a pixel value with 1/16 pixel accuracy. The value of $fb_L[p]$ depends on a position p (p=1, 2, . . . , 15) with 1/16 pixel accuracy. The position p is equal to xFracL or yFracL. Along with the increase of the value of p, $fb_L[p][0]$ monotonically decreases, and the value of $fb_L[p][1]$ monotonically increases.

First, in the prediction image generation unit 303751 for modification motion vector search, whether or not each of xFracL and yFracL is 0 is determined. In a case that each of xFracL and yFracL is 0, the DMVR unit 30375 derives predSamplesLXL by using any one of the following equations, according to the value of BitDepthY.

predSamplesLXL=(BitDepthY<=10)?(refPicLXL
[xIntL][yIntL]<<shift3):((refPicLXL[xIntL]
[yIntL]+offset3)>>shift4)

In a case that xFracL is not 0 and yFracL is 0, the prediction image generation unit 303751 for modification motion vector search derives predSamplesLXL by using the following equation.

predSamplesLXL=(fb$_L$[xFracL][0]*refPicLXL[Clip3
(0,picW−1,xIntL)][yIntL]+fb$_L$[xFracL][1]*refPi-
cLXL[Clip3(0,picW−1,xIntL+1)][yIntL]+
offset1)>>shift1

In a case that xFracL is 0 and yFracL is not 0, the DMVR unit 30375 derives predSamplesLXL by using the following equation.

predSamplesLXL=(fb$_L$[yFracL][0]*refPicLXL[xIntL]
[Clip3(0,picH−1,yIntL)]+fb$_L$[yFracL][1]*refPi-
cLXL[xIntL][Clip3(0,picH−1,yIntL+1)]+
offset1)>>shift1

In a case that neither xFracL nor yFracL is 0, the prediction image generation unit 303751 for modification motion vector search derives predSamplesLXL as follows. First, the DMVR unit 30375 derives temp[n] by using the following equation. Derivation processing of temp[ ] is performed n times, with the reference positions being changed. n=0 represents the first derivation processing, and n=1 represents the second derivation processing.

yPosL=Clip3(0,PicH−1,yIntL+n−3)

temp[n]=(fb$_L$[xFracL][0]*refPicLXL[Clip3(0,picW−
1,xIntL)][yPosL]+fb$_L$[xFracL][1]*refPicLXL
[Clip3(0,picW−1,xIntL+1)][yPosL]+
offset1)>>shift1

Subsequently, the DMVR unit 30375 derives predSamplesLXL by using the following equation.

predSamplesLXL=(fb$_L$[yFracL][0]*temp[0]+fb$_L$
[yFracL][1]*temp[1])>>shift2

Next, the initial error generation unit 303752 refers to the following.
  Width nCbW of the target block
  Height nCbH of the target block
  Two prediction images predSampleL1 and predSampleL2 having a size of (nCbW+4)×(nCbH+4)
  The variables offsetH[0], offsetH[1], offsetV[0], and offsetV[1]
Then, the initial error generation unit 303752 derives a list Sad1 of the sums of absolute differences of the pixel values included in predSampleL1 and predSampleL2, and a variable centerSad.

The DMVR unit 30375 configures the value of each element of 2×9 arrays bC as in the following equations.

bC[0][0]=−1bC[1][0]=−1 bC[0][1]=−1bC[1][1]=0 bC[0][2]=−1bC[1][2]=1 bC[0][3]=0bC[1][3]=−1 bC[0][4]=0bC[1][4]=0 bC[0][5]=0bC[1][5]=1 bC[0][6]=1bC[1][6]=−1 bC[0][7]=1bC[1][7]=0 bC[0][8]=1bC[1][8]=1

The initial error generation unit 303752 derives elements sadList[i] (i=0, ..., 8) of Sad1 using the following equation.

$$sadList[i] = \sum_{x=0}^{nCbW-1} \sum_{y=0}^{nCbH/2-1} \text{abs}(predSamplesL0[x + bC[0][i] + \textit{offset}$$
$$H[0]][2*y + bC[1][i] + \textit{offsetV}[0]] -$$
$$predSamplesL1[x - bC[0][i] + \textit{offsetH}[1]][2*y -$$
$$bC[1][i] + \textit{offsetV}[1]]) \quad \text{[Math. 1]}$$

In addition, the initial error generation unit 303752 derives centerSad by using the following equation.

$$centerSad = \sum_{x=0}^{nCbW-1} \sum_{y=0}^{nCbH/2-1} \text{abs} \quad \text{[Math. 2]}$$
$$(predSamplesL0[x + \textit{offsetH}[0]][2*y + \textit{offsetV}[0]] -$$
$$predSamplesL1[x + \textit{offsetH}[1]][2*y + \textit{offsetV}[1]])$$

The initial error generation unit 303752 determines whether or not centerSad is (bH>>1)*(bW)*4 or larger. dmvrFlag is a flag indicating that the DMVR processing is performed in a case of TRUE, and that the DMVR processing is not performed in a case of FALSE. In a case that centerSad is smaller than (bH>>1)*(bW)*4, the error is small, and thus the initial error generation unit 303752 determines that the DMVR processing need not be performed, sets dmvrFlag equal to FALSE, does not modify the motion vector, and the process proceeds to the inter prediction image generation unit 309.

In a case that centerSad is (bH>>1)*(bW)*4 or larger, the initial error generation unit 303752 sets dmvrFlag equal to TRUE. The motion vector search unit 303753 refers to the following.
  Number n of search points
  Elements sadList of the list Sad1 of the sums of absolute differences of the search points Then, the motion vector search unit 303753 derives an index bestIdx. n is a positive integer.

The following will describe a case of n=9. Note that the value of the number n of search points may be other than 9. Other than the method described in the present embodiment, for example, the minimum value of the value of sadList may be selected simply with n=25.

The motion vector search unit 303753 determines whether or not sadList[1]<sadList[7] holds, and whether or not sadList[3]<sadList[5] holds.

In a case that sadList[1]<sadList[7] holds and sadList[3]<sadList[5] holds, the DMVR unit 30375 sets the value of idx equal to 0. Subsequently, the motion vector search unit 303753 determines whether or not sadList[1]<sadList[3] holds. The motion vector search unit 303753 sets the value of bestIdx equal to 1 in a case that sadList[1]<sadList[3] holds, and sets the value equal to 3 in a case that sadList[1]<sadList[3] does not hold.

Otherwise, in a case that sadList[1]>=sadList[7] holds and sadList[3]<sadList[5] holds, the motion vector search unit 303753 sets the value of idx equal to 6. Subsequently, the DMVR unit 30375 determines whether or not sadList[7]<sadList[3] holds. The motion vector search unit 303753 sets the value of bestIdx equal to 7 in a case that sadList[7]<sadList[3] holds, and sets the value equal to 3 in a case that sadList[7]<sadList[3] does not hold.

Otherwise, in a case that sadList[1]<sadList[7] holds and sadList[3]>=sadList[5] holds, the motion vector search unit 303753 sets the value of idx equal to 2. Subsequently, the DMVR unit 30375 determines whether or not sadList[1]<sadList[5] holds. The DMVR unit 30375 sets the value of bestIdx equal to 1 in a case that sadList[1]<sadList[5] holds, and sets the value equal to 5 in a case that sadList[1]<sadList[5] does not hold.

Otherwise, in a case that sadList[1]>=sadList[7] holds and sadList[3]>=sadList[5] holds, the motion vector search unit 303753 sets the value of idx equal to 8. Subsequently, the DMVR unit 30375 determines whether or not sadList[7]<sadList[5] holds. The DMVR unit 30375 sets the value of bestIdx equal to 7 in a case that sadList[7]<sadList[5] holds, and sets the value equal to 5 in a case that sadList[7]<sadList[5] does not hold.

In addition, the motion vector search unit 303753 determines whether or not sadList[4]<=sadList[bestIdx] holds. In a case that sadList[4]<=sadList[bestIdx] holds, the DMVR unit 30375 updates the value of bestIdx to 4. In contrast, in a case that sadList[4]<=sadList[bestIdx] does not hold, the DMVR unit 30375 does not update the value of bestIdx.

In addition, the motion vector search unit 303753 determines whether or not sadList[idx]<sadList[bestIdx] holds. In a case that sadList[idx]<sadList[bestIdx] holds, the DMVR unit 30375 sets bestIdx equal to idx. In contrast, in a case that sadList[idx]<sadList[bestIdx] does not hold, the motion vector search unit 303753 does not update the value of bestIdx.

The motion vector search unit 303753 determines whether or not the value of bestIdx is 4. In a case that the value of bestIdx is 4, the motion vector search unit 303753 sets halfPelAppliedflag equal to true.

In a case that the value of bestIdx is not 4, the motion vector search unit 303753 calculates the values of variables dmvx and dmvy by using the following equations.

$$dmvx=(bestIdx/3-1)$$

$$dmvy=(bestIdx \%3-1)$$

In addition, the motion vector search unit 303753 updates offsetH and offsetV by using the following equations.

$$offsetH[0]=offsetH[0]+dmvx, offsetV[0]=offsetV[0]+dmvy$$

$$offsetH[1]=offsetH[1]-dmvx, offsetV[1]=offsetV[1]-dmvy$$

By using updated offsetH and offsetV, the motion vector search unit 303753 derives Sad2 through processing similar to the processing of deriving Sad1 described above. In addition, the motion vector search unit 303753 re-derives bestIdx by using Sad2 instead of Sad1.

The motion vector search unit 303753 determines whether or not the re-derived value of bestIdx is 4. In a case that the value of bestIdx is 4, the motion vector search unit 303753 sets halfPelAppliedflag equal to true.

In a case that the value of bestIdx is not 4, the motion vector search unit 303753 calculates dmvx and dmvy by using the following equations.

$$dmvx=(bestIdx/3-1), dmvy=(bestIdx \%3-1)$$

In addition, the DMVR unit 30375 calculates dmvL0 and dmvL1 using the following equation.

$$dmvL0[0]=16*dmvx, dmvL0[1]=16*dmvy$$

$$dmvL1[0]=-16*dmvx, dmvL1[1]=-16*dmvy$$

In a case that halfPelAppliedflag is true, the motion vector search unit 303753 derives modified dmvL0 and dmvL1 as follows. Note that sadList shown below is an element of Sad2 in a case that Sad2 is present, and is an element of Sad1 in a case that Sad2 is not present.

First, the motion vector search unit 303753 determines whether or not sadList[1]+sadList[7]==sadList[4] holds. In a case that sadList[1]+sadList[7]==sadList[4] holds, and mrSadT+mrSadB−(mrSadC<<1)==0 holds, the motion vector search unit 303753 sets dmv[0]=0. In a case that sadList[1]+sadList[7]==sadList[4] does not hold, the motion vector search unit 303753 calculates dmv[0] by using the following equation.

$$dmv[0]=((sadList[1]-sadList[7])<<3)/(sadList[1]+sadList[7]-(sadList[4]<<1))$$

Next, the modified vector derivation unit 303754 determines whether or not sadList[3]+sadList[5]==sadList[4] holds. In a case that sadList[3]+sadList[5]==sadList[4] holds, and mrSadL+mrSadR−(mrSadC<<1)==0 holds, the modified vector derivation unit 303754 sets dmv[1]=0. In a case that sadList[3]+sadList[5]==sadList[4] does not hold, the modified vector derivation unit 303754 calculates dmv[1] by using the following equation.

$$dmv[1]=((sadList[3]-sadList[5])<<3)/(sadList[3]+sadList[5]-(sadList[4]<<1))$$

In addition, the modified vector derivation unit 303754 modifies the motion vectors mvL0 and mvL1 by using the following equations.

$$dmvL0[0]=dmvL0[0]+dmv[0]$$

$$dmvL0[1]=dmvL0[1]+dmv[1]$$

$$dmvL1[0]=dmvL1[0]-dmv[0]$$

$$dmvL1[1]=dmvL1[1]-dmv[1]$$

The DMVR unit 30375 adds a derived difference vector dmvLX to the prediction vector mvpLX input from the merge predictor 30374, and thereby calculates the motion vector mvLX. The DMVR unit 30375 outputs mvLX to the inter prediction image generation unit 309.

$$mvLX[0]=mvpLX[0]+dmvLX[0]$$

$$mvLX[1]=mvpLX[1]+dmvLX[1]$$

Note that the values of dmvLX[0] and dmvLX[1] are restricted from −8 to 8, regardless of the number of bits of sadList.

Determination Criterion of DMVR dmvrFlag is a flag indicating that the DMVR processing is performed in a case of TRUE, and that the DMVR processing is not performed in a case of FALSE.

In a case that a flag, which is a flag of SPS and is a flag indicating that the DMVR processing is possible, is On, the initial error generation unit 303752 sets dmvrFlag equal to TRUE. Otherwise, the initial error generation unit 303752 sets dmvrFlag equal to FALSE.

Further, in a case that merge_flag of the block is TRUE, the initial error generation unit 303752 may set dmvrFlag equal to TRUE. Otherwise, the initial error generation unit 303752 sets dmvrFlag equal to FALSE.

Further, in a case that both of predFlagL0 and predFlagL1 are TRUE, that is, in a case of the bi-directional prediction, the initial error generation unit 303752 may set dmvrFlag equal to TRUE. Otherwise, the initial error generation unit 303752 sets dmvrFlag equal to FALSE.

In a case that mmvd_flag of the block is FALSE, that is, not an MMVD mode, the initial error generation unit 303752 may set dmvrFlag equal to TRUE. Otherwise, in a case of the MMVD mode, the initial error generation unit 303752 sets dmvrFlag equal to FALSE.

In a case that DiffPicOrderCnt(currPic, RefPicList[0][refIdxL0]) is equal to DiffPicOrderCnt(RefPicList[1][refIdxL1], currPic), that is, in a case that an L0 reference picture RefPicList[0][refIdxL0] and an L1 reference picture RefPicList[1][refIdxL1] are in such a positional relationship of being interpolated at equal distances regarding the current picture currPic, the initial error generation unit 303752 may set dmvrFlag equal to TRUE. Otherwise, the initial error generation unit 303752 sets dmvrFlag equal to FALSE. Here, DiffPicOrderCnt( ) is a function that derives difference of Picture Order Count (POC: display order of pictures) between two images as below.

DiffPicOrderCnt(picA,picB)=PicOrderCnt(picA)−PicOrderCnt(picB)

Note that, in a case that DiffPicOrderCnt(currPic, RefPicList[0][refIdxL0])*DiffPicOrderCnt(currPic, RefPicList[1][refIdxL1])<0 holds, in a case of being in a simply interpolated positional relationship, the initial error generation unit 303752 may set dmvrFlag equal to TRUE; otherwise, the initial error generation unit 303752 may set dmvrFlag equal to FALSE.

Further, in a case that the size of a processing block is a specific size or less, the initial error generation unit 303752 may set dmvrFlag equal to FALSE. For example, in a case that bH is 8 or more and bH*bW is 64, the initial error generation unit 303752 may set dmvrFlag equal to TRUE. Otherwise, the initial error generation unit 303752 sets dmvrFlag equal to FALSE.

Figure 11:
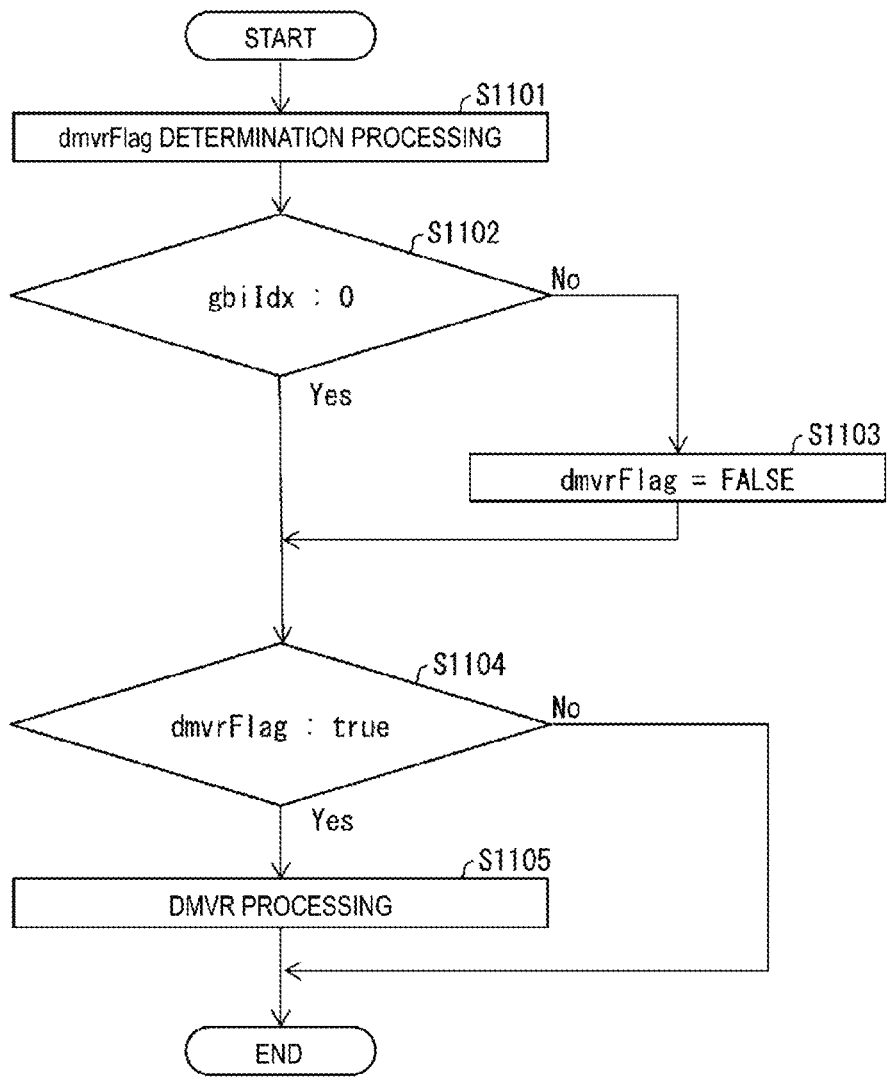
FIG. 11 is a flowchart illustrating a flow of processing in the DMVR unit.

FIG. 11 is a flowchart illustrating a flow of processing in the DMVR unit 30375. In the present embodiment, in addition to the determination criterion described above, as illustrated in FIG. 11, a condition that the DMVR processing is applied only in a case that GBI processing to be described later is not applied is added.

Specifically, first, the DMVR unit 30375 performs determination processing of dmvrFlag (S1101) described in the above. Next, the DMVR unit 30375 performs determination (S1102) as to whether or not gbiIdx is 0. As will be described later, non-equally weighted prediction is performed, based on a table gbiWLut, in a case of gbiIdx is non-zero value. In addition to a condition of setting dmvrFlag equal to TRUE in a case that gbiIdx is 0, dmvrFlag is set equal to FALSE (S1103), in a case that gbiIdx is non-zero.

In addition, the DMVR unit 30375 determines whether or not dmvrFlag is TRUE (S1104), and in a case that dmvrFlag is TRUE, the DMVR unit 30375 performs the DMVR processing (S1105), and in a case that dmvrFlag is FALSE, the DMVR unit 30375 does not perform the DMVR processing.

In a case that GBI prediction is applied, weighted prediction is applied, and thus by restricting an application condition in consideration of the fact that errors are not correctly evaluated, the entire amount of processing can be reduced.

Similarly, in weighted prediction to be described later, in a case that any one of L0 prediction and L1 prediction of applying the DMVR processing performs weighted prediction, dmvrFlag is set equal to FALSE. Specifically, in a case that both of luma_weight_l0_flag[refIdxL0] indicating whether or not a weight coefficient w0 and an offset o0 of luminance are present in an L0 prediction picture and luma_weight_l1_flag[refIdxL1] indicating whether or not a weight coefficient w1 and an offset o1 of luminance are present in an L1 prediction picture are FALSE, dmvrFlag is added to the condition of TRUE; otherwise, dmvrFlag is set equal to FALSE.

Determination of BDOF Through Error Threshold Processing in DMVR

In DMVR, processing of calculating errors of an L0 prediction image and an L1 prediction image is performed. Based on values of the errors of this case, whether or not BDOF processing (described later) that is performed in a later stage is performed is determined in advance.

Figure 12:
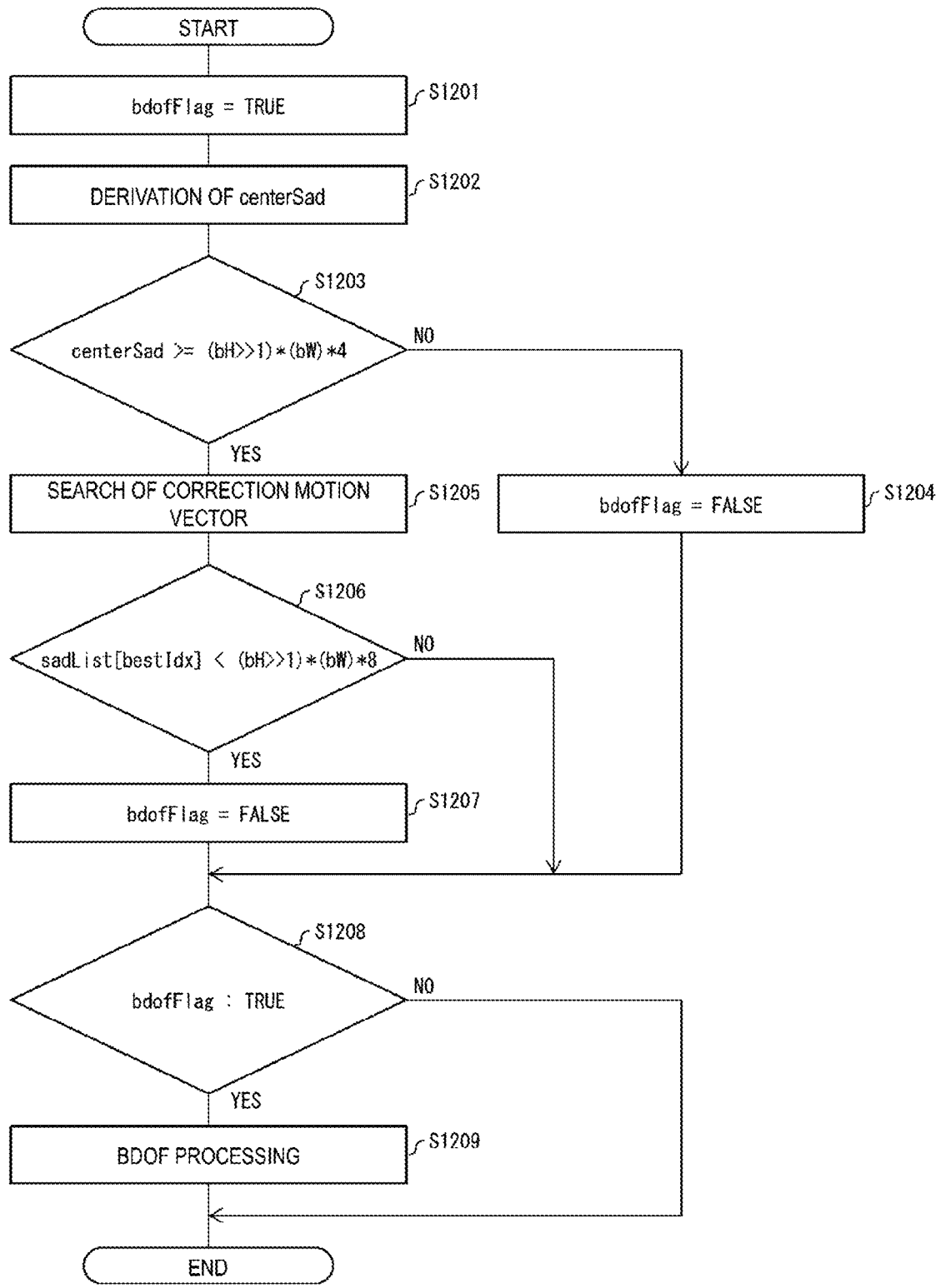
FIG. 12 is a flowchart illustrating processing of performing determination of BDOF through error threshold processing in DMVR.

FIG. 12 is a flowchart illustrating processing of performing determination of BDOF through error threshold processing in DMVR.

First, the initial error generation unit 303752 sets bdofFlag to TRUE in advance (S1201). Next, the initial error generation unit 303752 derives centerSad (S1202), and determines whether or not the value of centerSad is equal to or larger than a value of a threshold (bH>>1)*bW*4(S1203). In a case that the value of centerSad is smaller than the threshold, the initial error generation unit 303752 determines that the error is small, sets bdofFlag indicating whether or not the BDOF processing is performed equal to FALSE (S1204), and arranges not to perform the BDOF processing in advance. The determination is determination similar to that of the initial error generation unit 30752 described above, and thus the motion vector search unit 303753 and the modified vector derivation unit 303754 are skipped and the DMVR processing is not performed either. In a case that the value of centerSad is equal to or larger than the threshold, the motion vector search unit 303753 performs modification motion vector search (S1205), and the modified vector derivation unit 303754 determines whether or not a value of sadList[bestIdx] being a minimum value of SAD of bestIdx as a result of the modification motion vector search is smaller than the value of the threshold (bH>>1)*bW*8(S1206). In a case that the value of sadList[bestIdx] is smaller than the threshold, the modified vector derivation unit 303754 determines that the error is small, sets bdofFlag indicating whether or not the BDOF processing is performed equal to FALSE (S1207), and does not perform the BDOF processing in advance.

Note that the threshold of (S1206) is a value equal to or larger than the threshold of (S1203).

In the DMVR processing, the processing of calculating the errors of the L0 prediction image and the L1 prediction image is necessary for the sake of search of the modified motion vector, whereas in the BDOF processing, there is no effect in a case that the errors are small, and therefore, by adding the processing as described above, determination as to whether or not BDOF is performed is enabled without addition of additional error calculation.

In a BDOF unit to be described later, whether or not bdofFlag is TRUE is determined (S1208), and in a case of Yes, in the inter prediction parameter decoder 303, the BDOF processing (S1209) is performed. In a case of No, in the block, it is determined that the BDOF processing is not performed.

Triangle Prediction

The Triangle prediction will now be described. In Triangle prediction, the target CU is split into two triangular prediction units by using a diagonal line or an opposite diagonal line as a boundary. The prediction image in each triangle prediction unit is derived by performing weighting mask processing on each pixel of the prediction image of the target CU (the rectangular block including the triangular prediction unit) depending on the position of the pixel. For example, a triangle image can be derived from a rectangular image by multiplication by masking in which the pixels of the triangular region included in the rectangular region are 1, whereas the pixels of the portions of the rectangular region other than the portion corresponding to the triangular region are 0. The adaptive weighting processing of the prediction image is applied to both regions across the diagonal line, and one prediction image of the target CU (rectangular block) is derived by adaptive weighting processing using two prediction images. This processing is referred to as Triangle combining processing. Transform (inverse transform) and quantization (inverse quantization) processing is applied to the entire target CU. Note that the Triangle prediction is applied only in a case of the merge prediction mode or the skip mode.

The Triangle predictor 30377 derives the prediction parameters corresponding to the two triangular regions used for the Triangle prediction, and outputs the derived prediction parameters to the inter prediction image generation unit 309. The Triangle prediction may be configured not to use bi-prediction for simplification of processing. In this case, an inter prediction parameter for a uni-prediction is derived in one triangular region. Note that the motion compensation unit 3091 and the Triangle combining unit 30952 derive two prediction images and perform composition by using the prediction images.

MMVD Predictor 30376

The MMVD predictor 30376 performs processing in Merge with Motion Vector Difference (MMVD) mode. The MMVD mode is a mode in which a motion vector is obtained by adding a difference vector at a prescribed distance and in a prescribed direction to a motion vector derived from the merge candidate (a motion vector derived from the motion vector of a neighboring block or the like). In the MMVD mode, the MMVD predictor 30376 efficiently derives a motion vector by using the merge candidate and limiting the value range of the difference vector to prescribed distances (e.g., eight distances) and prescribed directions (e.g., four directions, eight directions, or the like).

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores a parameter decoded by the parameter decoder 302, the prediction mode predMode decoded by the entropy decoder 301, and the like.

To the prediction image generation unit 308, the prediction mode predMode, the prediction parameter, and the like are input. In addition, the prediction image generation unit 308 reads a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block refers to a set of pixels (referred to as a block because they are normally rectangular) on a reference picture and is a region that is referred to for generating a prediction image.

Inter Prediction Image Generation Unit 309

In a case that the prediction mode predMode indicates the inter prediction mode, the inter prediction image generation unit 309 generates a prediction image of a block or a subblock using the inter prediction, by using the inter prediction parameter input from the inter prediction parameter decoder 303 and the read reference picture.

Figure 13:
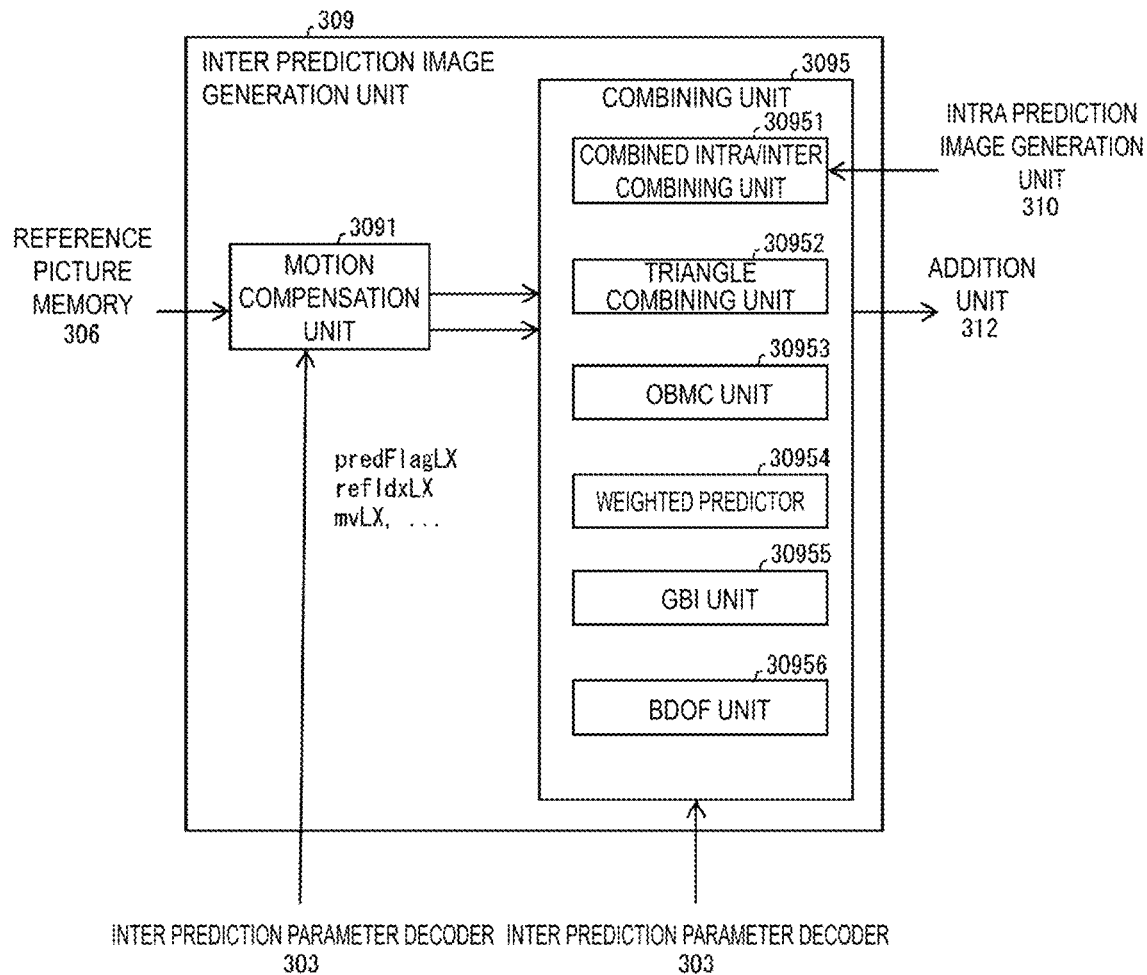
FIG. 13 is a schematic diagram illustrating a configuration of an inter prediction image generation unit included in a prediction image generation unit.

FIG. 13 is a schematic diagram illustrating the configuration of the inter prediction image generation unit 309 included in the prediction image generation unit 308 according to the present embodiment. The inter prediction image generation unit 309 includes a motion compensation unit (prediction image generation apparatus) 3091 and a combining unit 3095.

Motion Compensation

The motion compensation unit 3091 (interpolation image generation unit) reads, from the reference picture memory 306, a block located at the position shifted by the motion vector mvLX from the position of the target block in a reference picture RefPicLX indicated by the reference picture index refIdxLX, based on the inter prediction parameters (the prediction list utilization flag predFlagLX, the reference picture index refIdxLX, the motion vector mvLX) that are input from the inter prediction parameter decoder 303, and thereby generates an interpolation image (motion compensation image). Here, in a case that the accuracy of the motion vector mvLX is not an integer accuracy, by applying a filter for generating a pixel of a fractional position called a motion compensation filter, the interpolation image is generated.

The motion compensation unit 3091 first derives an integer position (xInt, yInt) and a phase (xFrac, yFrac) corresponding to in-prediction block coordinates (x, y) by the following equation.

$$xInt = xPb + (mvLX[0] >> (\log 2(MVPREC))) + x$$

$$xFrac = mvLX[0] \& (MVPREC-1)$$

$$yInt = yPb + (mvLX[1] >> (\log 2(MVPREC))) + y$$

$$yFrac = mvLX[1] \& (MVPREC-1)$$

Here, (xPb, yPb) indicates the upper left coordinates of a block with a bW*bH size, that is, x=0 . . . bW−1, y=0 . . . bH−1, and MVPREC indicates the accuracy of the motion vector mvLX (1/MVPREC pixel accuracy). For example, MVPREC may be 16.

The motion compensation unit 3091 derives a temporary image temp[ ][ ] by performing horizontal interpolation processing on a reference picture refImg using an interpolation filter. In the following equation, Σ is the sum related to k of k=0, . . . , NTAP−1, shift1 is a normalization parameter for adjusting a value range, and offset1=1<<(shift1−1).

$$temp[x][y] = (\Sigma mcFilter[xFrac][k] * refImg[xInt+k-NTAP/2+1][yInt] + offset1) >> shift1$$

Subsequently, the motion compensation unit 3091 derives an interpolation image Fred[ ][ ] by performing vertical interpolation processing on the temporary image temp[ ][ ]. In the following equation, Σ is the sum related to k of k=0, . . . , NTAP−1, shift2 is a normalization parameter for adjusting a value range, and offset2=1<<(shift2−1).

$$Pred[x][y] = (\Sigma mcFilter[yFrac][k] * temp[x][y+k-NTAP/2+1] + offset2) >> shift2$$

Combining Unit

The combining unit 3095 refers to the interpolation image input from the motion compensation unit 3091, the inter prediction parameter input from the inter prediction parameter decoder 303, and the intra image input from the intra prediction image generation unit 310, to generate a prediction image, and outputs the generated prediction image to the addition unit 312.

The combining unit 3095 includes a Combined intra/inter combining unit 30951, a Triangle combining unit 30952, an OBMC unit 30953, and a BDOF unit 30956.

Combined Intra/Inter Combining Processing

The Combined intra/inter combining unit 30951 generates a prediction image by compositionally using the uni-prediction, skip mode, merge mode, and intra prediction in AMVP.

Triangle Combining Processing

The Triangle combining unit 30952 generates a prediction image using the Triangle prediction described above.

OBMC Processing

The OBMC unit 30953 generates a prediction image by using Overlapped block motion compensation (OBMC) processing. The OBMC processing includes the following processing.

The interpolation image (motion compensation image) of the target subblock is generated by using the interpolation image (PU interpolation image) that is generated using the inter prediction parameter provided for the target subblock and the interpolation image (OBMC interpolation image) that is generated by using a motion parameter of the neighboring subblock of the target subblock.

A prediction image is generated by weighted-averaging the OBMC interpolation image and the PU interpolation image.

Weighted Predictor 30954

The weighted predictor 309454 generates a prediction image of a block by multiplying motion compensation images PredL0 and PredL1 by a weight coefficient. In a case that one of prediction list utilization flags (predFlagL0 or predFlagL1) is 1 (uni-prediction) and no weighted prediction is used, processing in accordance with the following equation is performed in which a motion compensation image PredLX (LX is L0 or L1) is adapted to the number of pixel bits bitDepth.

$$Pred[x][y]=Clip3(0,(1<<bitDepth)-1,(PredLX[x][y]+offset1)>>shift1)$$

Here, shift1=Max(2,14−bitDepth) and offset1=1<<(shift1−1) are established.

Bi-Directional Prediction Processing

Furthermore, in a case that both of prediction list utilization flags (predFlagL0 and predFlagL1) are 1 (bi-prediction BiPred) and no weighted prediction is used, processing in accordance with the following equation is performed in which the motion compensation images PredL0 and PredL1 are averaged and adapted to the number of pixel bits.

$$Pred[x][y]=Clip3(0,(1<<bitDepth)-1,(PredL0[x][y]+PredL1[x][y]+offset2)>>shift2)$$

Here, shift2=Max(3, 15−bitDepth) and offset2=1<<(shift2−1) are established. The processing is hereinafter also referred to as normal bi-directional prediction.

In addition, in a case of the uni-prediction, and that the flag (in a case of luminance, luma_weight_l0_flag, and in a case of chrominance, chroma_weight_l0_flag) indicating whether or not a weighted prediction coefficient w0 and an offset o0 are present in the reference picture of L0 is on, in a case of the L0 prediction, the weighted predictor 30954 derives the weighted prediction coefficient w0 and the offset o0 from the coded data, and performs processing of the following equation.

$$Pred[x][y]=Clip3(0,(1<<bitDepth)-1,((PredL0[x][y]*w0+(1<<(log\ 2WD-1)))>>log\ 2WD)+o0)$$

In a case of the L1 prediction, in a case that the flag indicating whether or not the weighted prediction coefficient w1 and the offset o1 are present in the reference picture of L1 (luma_weight_l1_flag in a case of luminance, chroma_weight_l1_flag in a case of chrominance) is on, the weighted predictor 30954 derives the weighted prediction coefficient w1 and the offset o1 from the coded data, and performs the processing of the following equation.

$$Pred[x][y]=Clip3(0,(1<<bitDepth)-1,((PredL1[x][y]*w1+(1<<(log\ 2WD-1)))>>log\ 2WD)+o1)$$

Here, log 2WD is, explicitly, a variable obtained by adding up the values of Log 2WeightDenom+shift1 that are transmitted in the slice header separately for luminance and chrominance.

Weighted Bi-Directional Prediction Processing

In addition, in a case of the bi-prediction BiPred and that the flag (in a case of luminance, luma_weight_l0_flag, luma_weight_l1_flag, and in a case of chrominance, chroma_weight_l0_flag, chroma_weight_l1_flag) indicating whether or not the weighted prediction coefficient and the offset are present performs the weighted prediction, the weighted predictor 30954 derives the weighted prediction coefficients w0, w1, o0, and of from the coded data, and performs the processing of the following equation.

$$Pred[x][y]=Clip3(0,(1<<bitDepth)-1,(PredL0[x][y]*w0+PredL1[x][y]*w1+((o0+o1+1)<<log\ 2WD))>>(log\ 2WD+1))$$

GBI Unit 30955

The weighted prediction in the above describes an example in which the prediction image is generated by multiplying the interpolation image by the weight coefficient. Here, another example in which the prediction image is generated by multiplying the interpolation image by the weight coefficient will be described. Specifically, processing of generating the prediction image by using generalized bi-directional prediction (Generalized bi-prediction, hereinafter referred to as GBI prediction) will be described. In the GBI prediction, the prediction image Pred is generated by multiplying the L0 prediction image PredL0 and the L1 prediction image PredL1 in the bi-prediction by the weight coefficients (w0, w1).

Further, in a case that the prediction image is generated by using the GBI prediction, the GBI unit 30955 switches the weight coefficients (w0, w1) in the unit of the coding unit. Specifically, the GBI unit 30954 of the inter prediction image generation unit 309 configures the weight coefficient for each coding unit. In the GBI prediction, multiple weight coefficient candidates are defined in advance, and gbiIdx is an index that indicates the weight coefficient used in the target block out of the multiple weight coefficient candidates included in the table gbiWLut.

The GBI unit 30955 checks a flag gbiAppliedFlag indicating whether or not the GBI prediction is used, and in a case that the flag indicates FALSE, the motion compensation unit 3091 generates the prediction image by using the following equation.

$$Pred[x][y]=Clip3(0,(1<<bitDepth)-1,(PredL0[x][y]+PredL1[x][y]+offset2)>>shift2)$$

Here, gbiAppliedFlag is FALSE in its initial state. In a case that a flag, which is a flag of SPS and is a flag indicating that the GBI processing is possible, is On, and in a case of the bi-directional prediction, the GBI unit 30955 sets gbiAppliedFlag equal to TRUE. In addition, as an additional (AND) condition, in a case that gbiIdx being an index of the table gbiWLut of the weight coefficient of the GBI prediction is not 0 (the value of the index in a case that the weights of the L0 prediction image and the L1 prediction image are equal), gbiAppliedFlag may be set equal to TRUE. In addition, as an additional (AND) condition, in a case that a block size of the CU is a certain size or larger, gbiAppliedFlag may be set equal to TRUE.

In a case that gbiAppliedFlag is true, the GBI unit 30955 derives the prediction image Fred from the weights w0, w1, and PredL0 and PredL1, by using the following equation.

$$Pred[x][y]=Clip3(0,(1<<bitDepth)-1,(w0*PredL0[x][y]+w1*PredL1[x][y]+offset3)>>(shift2+3))$$

Here, the weight coefficient w1 is a coefficient derived with gbiIdx that is explicitly indicated with syntax, from a table iWLut[ ]={4, 5, 3, 10, −2}. The weight coefficient w0 is assumed to be (8−w1). Note that, in a case that gbiIdx=0, w0=w1=4, which is equivalent to the normal bi-directional prediction.

shift1, shift2, offset1, and offset2 are derived using the following equations.

$$shift1=Max(2,14-bitDepth)$$

$$shift2=Max(3,15-bitDepth)=shift1+1$$

$$offset1=1<<(shift1-1)$$

$$offset2=1<<(shift2-1)$$

$$offset3=1<<(shift2+2)$$

Note that there are multiple tables gbiWLut having different combinations of the weight coefficients, and the GBI unit 30955 may switch the tables used for selection of the weight coefficient depending on a picture configuration is LowDelay (LB).

In a case that the GBI prediction is used in the AMVP prediction mode, the inter prediction parameter decoder 303 decodes gbiIdx, and transmits decoded gbiIdx to the GBI unit 30955. Further, in a case that the GBI prediction is used in the merge prediction mode, the inter prediction parameter decoder 303 decodes the merge index merge_idx, and the merge candidate derivation unit 30361 derives gbiIdx of each merge candidate. Specifically, the merge candidate derivation unit 30361 uses the weight coefficient of the neighboring block used for derivation of the merge candidate as the weight coefficient of the merge candidate used for the target block. In other words, in the merge mode, the weight coefficient being previously used is taken over as the weight coefficient of the target block.

Selection of Prediction Mode Using GBI Prediction

Figure 14:
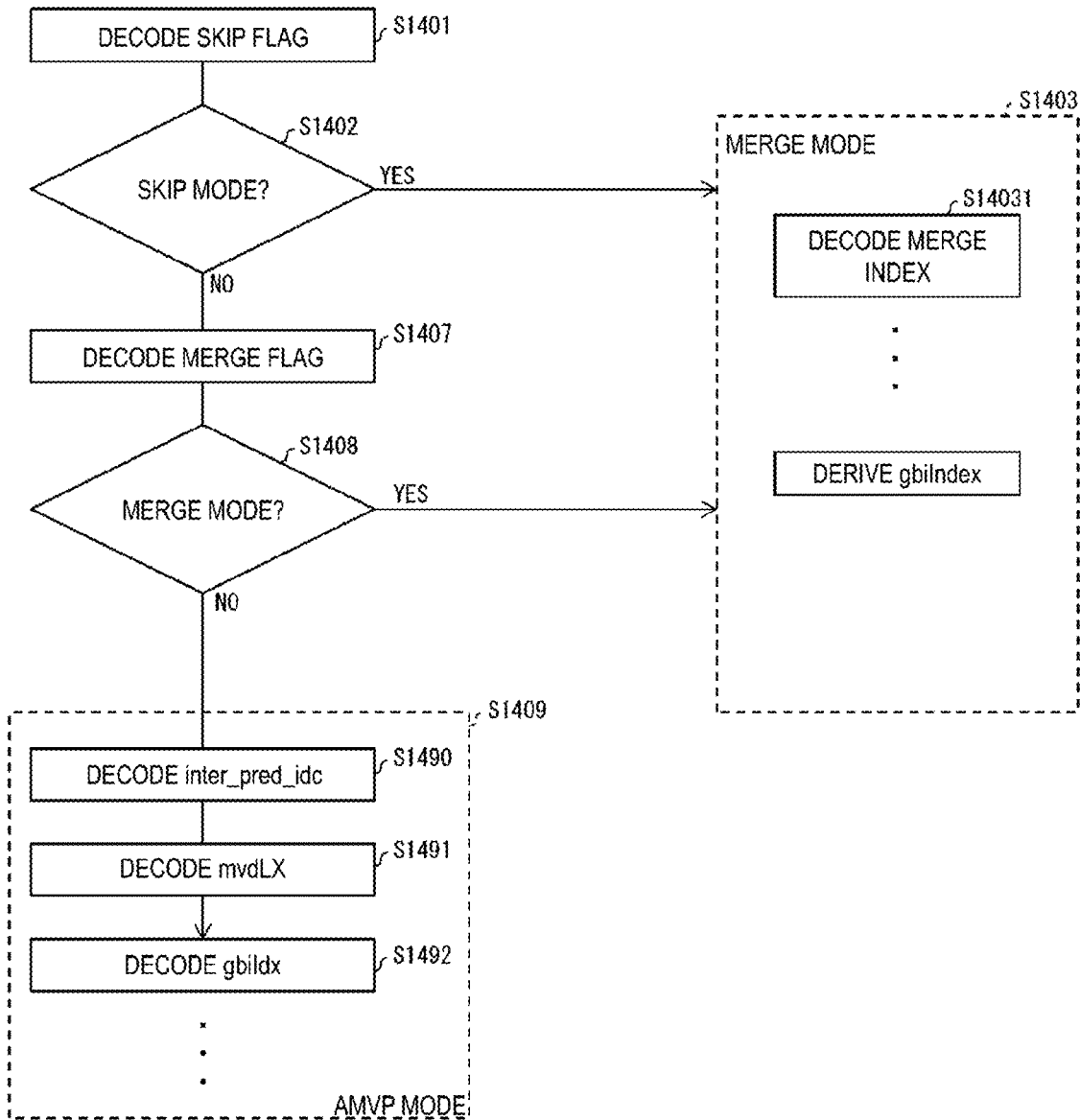
FIG. 14 is a flowchart illustrating an example of a flow of selection processing of a prediction mode in the video decoding apparatus.

Next, with reference to FIG. 14, selection processing of the prediction mode using the GBI prediction in the video decoding apparatus 31 will be described. FIG. 14 is a flowchart illustrating an example of a flow of the selection processing of the prediction mode in the video decoding apparatus 31.

As illustrated in FIG. 14, the inter prediction parameter decoder 303 first decodes a skip flag (S1401). In a case that the skip flag indicates that the skip mode is active (YES in S1402), the prediction mode becomes the merge mode (S1403), and the inter prediction parameter decoder 303 decodes the merge index (S14031), and in a case that the GBI prediction is used, the GBI unit 30955 derives the weight coefficient derived with the merge candidate as the weight coefficient of the GBI prediction.

In a case that the skip flag does not indicate that the skip mode is active (NO in S1402), the inter prediction parameter decoder 303 decodes the merge flag (S1407). In a case that the merge flag indicates that the merge mode is active (YES in S1408), the prediction mode becomes the merge mode (S1403), and the inter prediction parameter decoder 303 decodes the merge index (S14031). In a case that the GBI prediction is used, the GBI unit 30955 derives the weight coefficient derived with the merge candidate as the weight coefficient of the GBI prediction.

In a case that the merge flag does not indicate that the merge mode is active (NO in S1408), the prediction mode is the AMVP mode (S1409).

In the AMVP mode, the inter prediction parameter decoder 303 decodes the inter prediction indicator inter_pred_idc (S14090). Subsequently, the inter prediction parameter decoder 303 decodes the difference vector mvdLX (S14091). Subsequently, the inter prediction parameter decoder 303 decodes gbiIdx (S14092), and in a case that the GBI prediction is used, the GBI unit 30955 selects the weight coefficient w1 of the GBI prediction from the weight coefficient candidates of the table of gbiWLut.

BDOF Prediction

Next, details of prediction (BDOF prediction) using the BDOF processing performed by the BDOF unit 30956 will be described. In the bi-prediction mode, the BDOF unit 30956 refers to two prediction images (a first prediction image and a second prediction image) and a gradient modification term, and thereby generates the prediction image.

Figure 15:
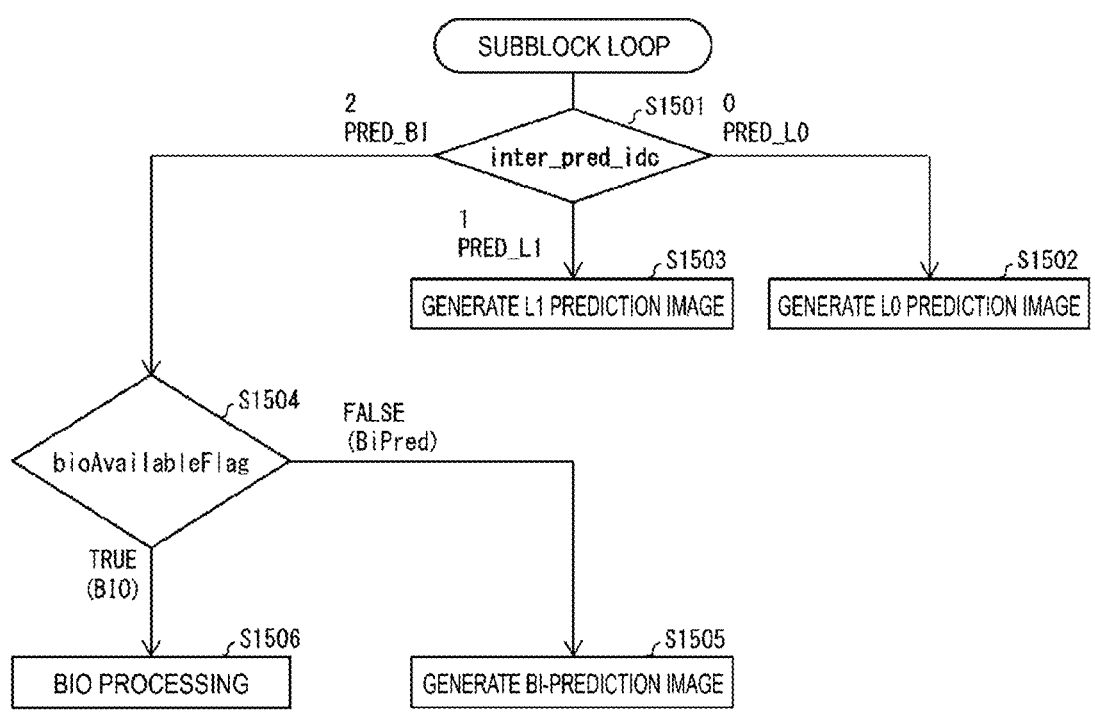
FIG. 15 is a flowchart illustrating a flow of processing of deriving a prediction image.

FIG. 15 is a flowchart illustrating a flow of processing of deriving the prediction image.

In a case that the inter prediction parameter decoder 303 determines that it is the unidirectional prediction of L0 (in 51501, inter_pred_idc is 0), the motion compensation unit 3091 generates the L0 prediction image PredL0[x][y] (S1502). In a case that the inter prediction parameter decoder 303 determines that it is the unidirectional prediction of L1 (in 51501, inter_pred_idc is 1), the motion compensation unit 3091 generates the L1 prediction image PredL1[x][y] (S1503). In contrast, in a case that the inter prediction parameter decoder 303 determines that it is the bi-prediction mode (in 51501, inter_pred_idc is 2), the processing continues to the processing of 51504 described below. In 51504, the combining unit 3095 refers to bioAvailableFlag indicating whether or not the BDOF processing is performed, and determines whether or not the BDOF processing is necessary. In a case that bioAvailableFlag indicates TRUE, the BDOF unit 30956 performs the BDOF processing, and generates a bi-directional prediction image (S1506). In a case that bioAvailableFlag indicates FALSE, the combining unit 3095 generates a prediction image through normal bi-directional prediction image generation (S1505).

In a case that an L0 reference image refImgL0 and an L1 reference image refImgL1 are different reference images, and the two pictures are in opposite directions with respect to the target picture, the inter prediction parameter decoder 303 may derive TRUE for bioAvailableFlag. Specifically, it is assumed that the target image is currPic, and in a case that the condition of DiffPicOrderCnt(currPic,refImgL0)*DiffPicOrderCnt(currPic,refImgL1)<0 is satisfied,bioAvailableFlag indicates TRUE.

Here, DiffPicOrderCnt( ) is a function that derives difference of Picture Order Count (POC: display order of pictures) between two images as below.

DiffPicOrderCnt(picA,picB)=PicOrderCnt(picA)−PicOrderCnt(picB)

As the condition that bioAvailableFlag indicates TRUE, a condition that the motion vector of the target block is not a motion vector in the unit of the subblock may be added.

Further, as the condition that bioAvailableFlag indicates TRUE, a condition that the motion vector of the target picture is not a motion vector in the unit of the subblock may be added.

Further, as the condition that bioAvailableFlag indicates TRUE, a condition that the sum of absolute differences of the L0 prediction image and the L1 prediction image of two prediction blocks is equal to or greater than a prescribed value may be added.

Further, as the condition that bioAvailableFlag indicates TRUE, a condition that a prediction image creation mode is a prediction image creation mode in the unit of the block may be added.

Further, as the condition that bioAvailableFlag indicates TRUE, a condition that, in the weighted prediction, neither the L0 prediction nor the L1 prediction performs the weighted prediction may be added. Specifically, in a case that both of luma_weight_l0_flag[refIdxL0] indicating whether or not the weight coefficient w0 and the offset o0 of luminance are present in the L0 prediction picture and luma_weight_l1_flag[refIdxL1] indicating whether or not the weight coefficient w1 and the offset o1 of luminance are present in the L1 prediction picture are FALSE, the condition that bioAvailableFlag indicates TRUE is used.

Figure 16:
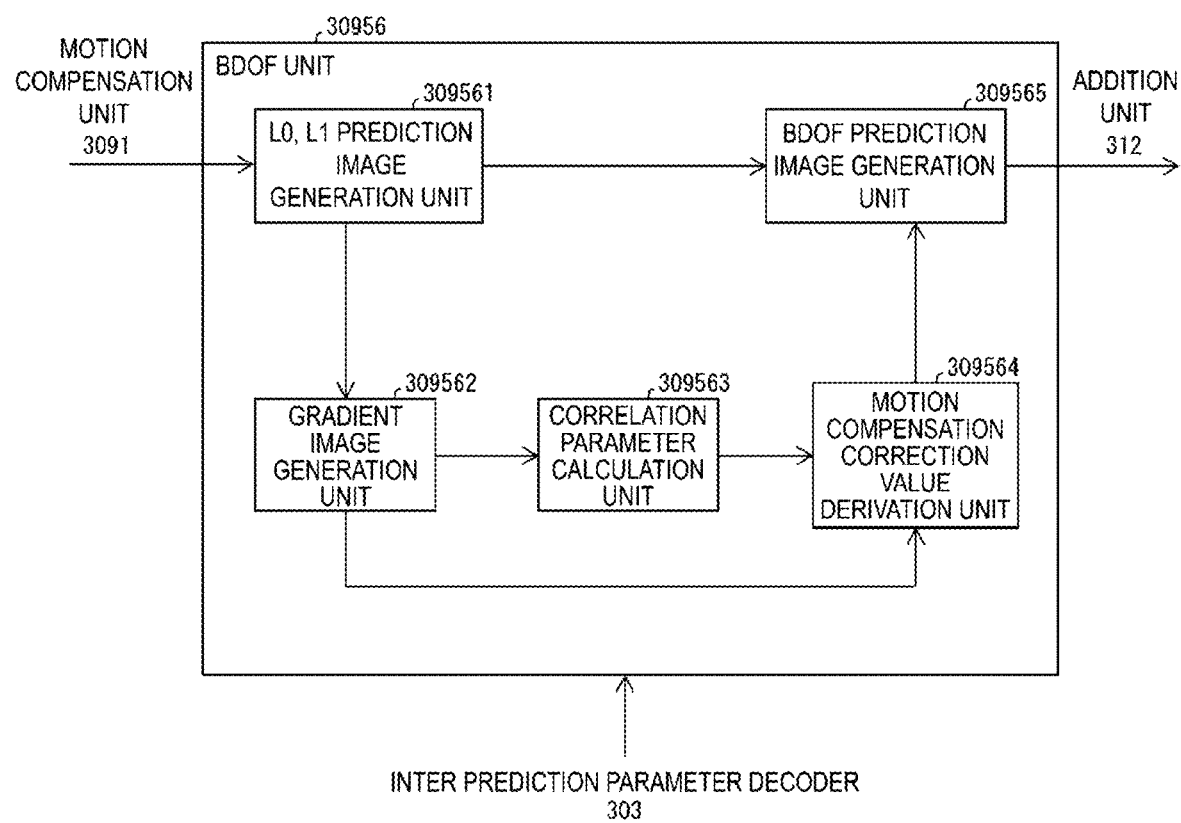
FIG. 16 is a schematic diagram illustrating a configuration of a BDOF unit.

FIG. 16 is a schematic diagram illustrating a configuration of the BDOF unit 30956. With reference to FIG. 16, specific details of processing performed by the BDOF unit 30956 will be described. The BDOF processing unit 30956 includes an L0, L1 prediction image generation unit 309561, a gradient image generation unit 309562, a correlation parameter calculation unit 309563, a motion compensation modified value derivation unit 309564, and a BDOF prediction image generation unit 309565. The BDOF unit 30956 generates the prediction image from the interpolation image received from the motion compensation unit 3091 and the inter prediction parameter received from the inter prediction parameter decoder 303, and outputs the generated prediction image to the addition unit 312. Note that processing of deriving a motion compensation modification value modBIO (motion compensation modified image) from a gradient image and modifying and deriving the prediction images of PredL0 and PredL1 is referred to as bi-directional optical flow sample prediction processing.

Figure 17:
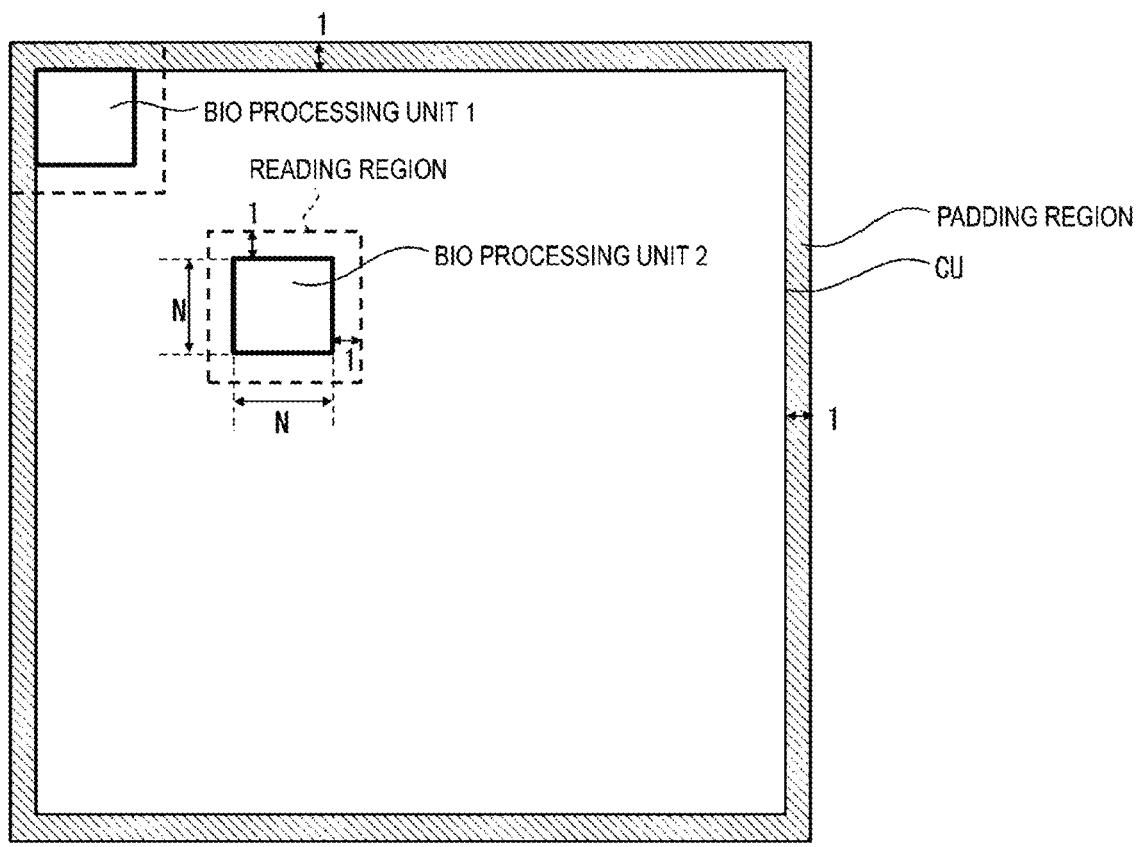
FIG. 17 is a diagram illustrating an example of a region in which the BDOF unit performs padding.

FIG. 17 is a diagram illustrating an example of a region in which padding is performed. First, in the L0, L1 prediction image generation unit 309561, an L0, L1 prediction image that is used for the BDOF processing is generated. In the BDOF unit 30956, the BDOF processing is performed based on the L0, L1 prediction image in each of the unit of the CU illustrated in FIG. 17 or the unit of the sub-CU; however, in order to calculate the gradient, extra interpolation image information for two pixels around the CU or the sub-CU being the target is needed. The interpolation image information of the part is generated using neighboring integer pixels, not a regular interpolation filter, for gradient image generation to be described later. In other cases, in the part, surrounding pixels are copied and used as a padding region, similarly to the outside of the picture. Further, the unit of the BDOF processing is N×N pixels of the unit of the CU or the unit of the sub-CU or smaller, and regarding the processing itself, processing is performed using (N+2)×(N+2) pixels through addition of one surrounding pixel.

In the gradient image generation unit 309562, a gradient image is generated. In gradient change (Optical Flow), it is assumed that the pixel value of each point is not changed, but only the position thereof is changed. This can be expressed as follows, using a change (horizontal gradient value $1x$) of a pixel value I in the horizontal direction and a change Vx of the position thereof, a change (vertical gradient value $1y$) of the pixel value I in the vertical direction and a change Vy of the position thereof, and a time-dependent change It of the pixel value I.

$$1x*Vx+1y*Vy+1t=0$$

The changes (Vx, Vy) of the positions are hereinafter referred to as modified weight vectors (u, v).

Specifically, the gradient image generation unit 309562 derives gradient images $1x0$, $1y0$, $1x1$, and $1y1$ from the following equations. $1x0$ and $1x1$ each represent a gradient in the horizontal direction, and $1y0$ and $1y1$ each represent a gradient in the vertical direction.

$$1x0[x][y]=(PredL0[x+1][y]-PredL0[x-1][y])>>shift1$$

$$1y0[x][y]=(PredL0[x][y+1]-PredL0[x][y-1])>>shift1$$

$$1x1[x][y]=(PredL1[x+1][y]-PredL1[x-1][y])>>shift1$$

$$1y1[x][y]=(PredL1[x][y+1]-PredL1[x][y-1])>>shift1$$

Here, shift1=Max(2, 14−bitDepth) is established.

Next, the correlation parameter calculation unit 309563 derives gradient product sums s1, s2, s3, s5, and s6 of (N+2)×(N+2) pixels by using one surrounding pixel of each block of N×N pixels in each CU.

$$s1=sum(phiX[x][y]*phiX[x][y])$$

$$s2=sum(phiX[x][y]*phiY[x][y])$$

$$s3=sum(-theta[x][y]*phiX[x][y])$$

$$s5=sum(phiY[x][y]*phiY[x][y])$$

$$s6=sum(-theta[x][y]*phiY[x][y])$$

Here, sum(a) represents the sum of a with respect to coordinates (x, y) in the block of (N+2)×(N+2) pixels. Further, the following are established.

$$theta[x][y]=-(PredL1[x][y]>>shift4)+(PredL0[x][y]>>shift4)$$

$$phiX[x][y]=(1x1[x][y]+1x0[x][y])>>shift5$$

$$phiY[x][y]=(1y1[x][y]+1y0[x][y])>>shift5$$

Here, the following are established.

$$shift4=Min(8,bitDepth-4)$$

$$shift5=Min(5,bitDepth-7)$$

Next, the motion compensation modified value derivation unit 309564 derives the modified weight vectors (u, v) in the unit of N×N pixels by using the derived gradient product sums s1, s2, s3, s5, and s6.

$$u=(s3<<3)>>\log 2(s1)$$

$$v=((s6<<3)-((((u*s2m)<<12)+u*s2s)>>1))>>\log 2(s5)$$

Here, s2 m=s2>>12 and s2s=s2 & ((1<<12)−1) are established.

Note that the ranges of u and v may further be restricted by using a clip as follows.

$$u=s1>0?\text{Clip3}(-th,th,-(s3<<3)>>\text{floor}(\log 2(s1))):0$$

$$v=s5>0?\text{Clip3}(-th,th,((s6<<3)-((((u*s2m)<<12)+u*s2s)>>1))>>\text{floor}(\log 2(s5))):0$$

Here, th=Max(2, 1<<(13−bitDepth)) is established. The value of th needs to be calculated in coordination with shift1, and thus a case that a pixel bit-depth bitDepth is larger than 12 bits is considered.

The motion compensation modified value derivation unit 309564 derives modBIO[x][y] of the motion compensation modified value of N×N pixels by using the modified weight vectors (u, v) in the unit of N×N pixels and the gradient images 1x0, 1y0, 1x1, and 1y1.

$$\text{modBIO}[x][y]=((1x1[x][y]-1x0[x][y])*u+(1y1[x][y]-1y0[x][y])*v+1)>>1 \quad \text{(Equation A3)}$$

Or using a round function, modBIO may be derived as follows.

$$\text{modBIO}[x][y]=\text{Round}(((1x1[x][y]-1x0[x][y])*u)>>1)+\text{Round}(((1y1[x][y]-1y0[x][y])*v)>>1)$$

The BDOF prediction image generation unit 309565 derives a pixel value Pred of the prediction image of N×N pixels, using the following equation with the use of the parameters described above.

In this case, the BDOF prediction image generation unit 309565 derives a pixel value Pred of the prediction image of N×N pixels, using the following equation with the use of the parameters described above.

$$\text{Pred}[x][y]=\text{Clip3}(0,(1<<\text{bitDepth})-1,(\text{PredL0}[x][y]+\text{PredL1}[x][y]+\text{modBIO}[x][y]+\text{offset2})>>\text{shift2})$$

Here, shift2=Max(3, 15−bitDepth) and offset2=1<<(shift2−1) are established.

Then, the BDOF prediction image generation unit 309565 outputs the generated prediction image of the block to the addition unit 312.

The inverse quantization and inverse transformer 311 performs inverse quantization on a quantization transform coefficient input from the entropy decoder 301 to calculate a transform coefficient. This quantization transform coefficient is a coefficient obtained by performing, in coding processing, a frequency transform such as a Discrete Cosine Transform (DCT) or a Discrete Sine Transform (DST) on prediction errors for quantization. The inverse quantization and inverse transformer 311 performs an inverse frequency transform such as an inverse DCT or an inverse DST on the calculated transform coefficient to calculate a prediction error. The inverse quantization and inverse transformer 311 outputs the calculated prediction error to the addition unit 312. The inverse quantization and inverse transformer 311 sets all prediction errors equal to zero in a case that skip_flag is 1 or in a case that cu_cbp is 0.

The addition unit 312 adds the prediction image of the block input from the prediction image generation unit 308 and the prediction error input from the inverse quantization and inverse transformer 311 to each other for each pixel, and generates a decoded image of the block. The addition unit 312 stores the decoded image of the block in the reference picture memory 306, and also outputs it to the loop filter 305.

Configuration of Video Coding Apparatus

Figure 18:
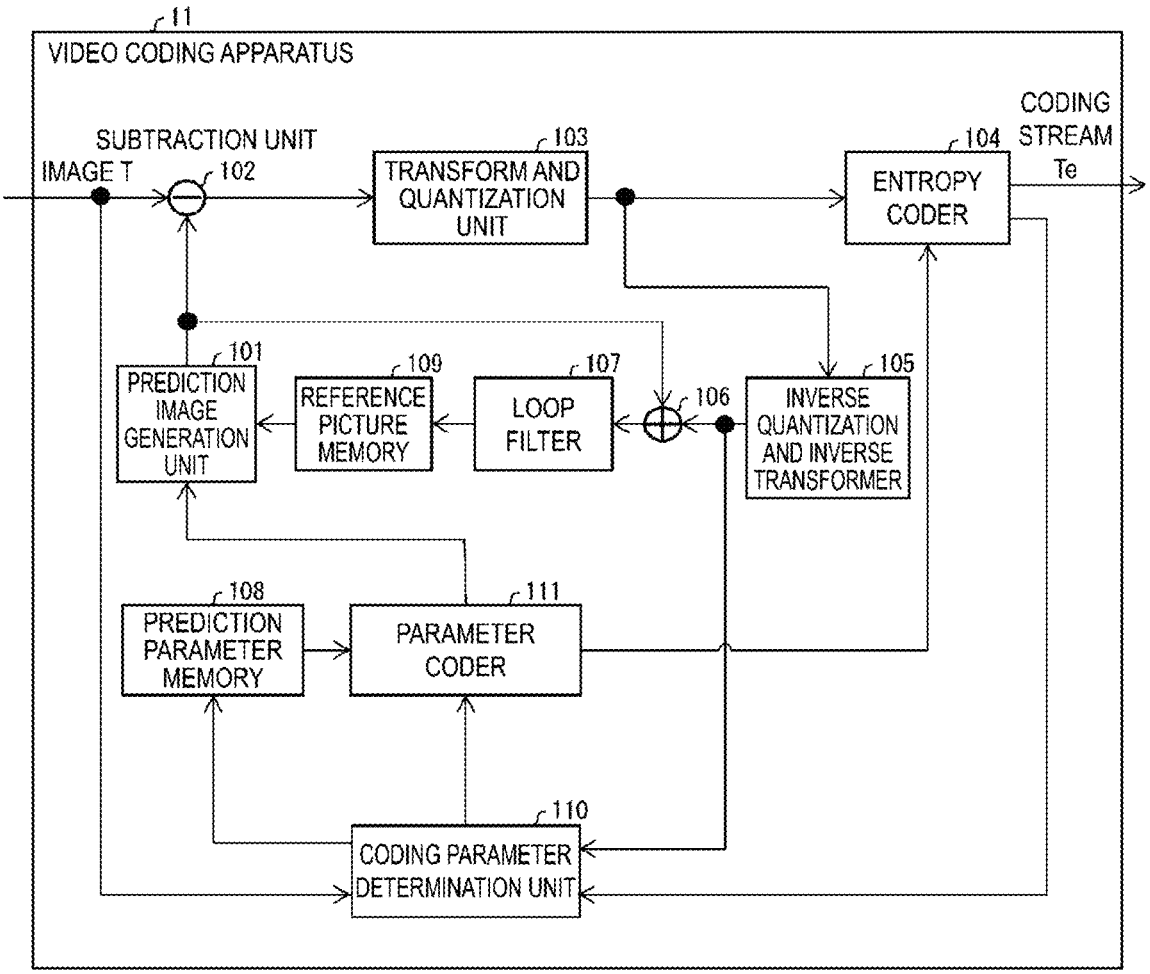
FIG. 18 is a schematic diagram illustrating a configuration of the video coding apparatus.

Next, a configuration of the video coding apparatus 11 according to the present embodiment will be described. FIG. 18 is a schematic diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transformer 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, and an entropy coder 104.

The prediction image generation unit 101 generates a prediction image for each CU that is a region obtained by splitting each picture of an image T. The operation of the prediction image generation unit 101 is the same as that of the prediction image generation unit 308 already described, and description thereof will be omitted.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient by quantization. The transform and quantization unit 103 outputs the quantization transform coefficient to the entropy coder 104 and the inverse quantization and inverse transformer 105.

The inverse quantization and inverse transformer 105 is the same as the inverse quantization and inverse transformer 311 (FIG. 7) in the video decoding apparatus 31, and descriptions thereof are omitted. The calculated prediction error is output to the addition unit 106.

To the entropy coder 104, the quantization transform coefficient is input from the transform and quantization unit 103, and coding parameters are input from the parameter coder 111. The coding parameter includes, for example, codes such as the reference picture index refIdxLX, the prediction vector index mvp_LX_idx, the difference vector mvdLX, the adaptive motion vector resolution mode amvr_mode, the prediction mode predMode, and the merge index merge_idx.

The entropy coder 104 performs entropy coding on the split information, the prediction parameter, the quantization transform coefficient, and the like, and generates and outputs the coding stream Te.

The parameter coder 111 includes a header coder 1110, a CT information coder 1111, a CU coder 1112 (prediction mode coder), and a parameter coder 112 (not illustrated). The CU coder 1112 further includes a TU coder 1114.

General operation of each module will be described below. The parameter coder 111 performs coding processing of parameters such as header information, split information, prediction information, and quantization transform coefficients.

The CT information coder 1111 codes the QT and MT (BT, TT) split information and the like from the coded data.

The CU coder 1112 codes the CU information, the prediction information, the TU split flag split_transform_flag, the CU residual flags cbf_cb, cbf_cr, and cbf_luma, and the like.

In a case that a prediction error is included in the TU, the TU coder 1114 codes the QP update information (quantization correction value) and the quantization prediction error (residual_coding).

The CT information coder 1111 and the CU coder 1112 output, to the entropy coder 104, syntax elements such as the inter prediction parameter (the prediction mode predMode, the merge flag merge_flag, the merge index merge_idx, the inter prediction indicator inter_pred_idc, the reference picture index refIdxLX, the prediction vector index mvp_LX_idx, the difference vector mvdLX), the intra prediction parameter (prev_intra_luma_pred_flag, mpm_idx, rem_selected_mode_flag, rem_selected_mode, and rem_non_selected_mode), and the quantization transform coefficient.

Configuration of Parameter Coder

The parameter coder 112 derives inter prediction parameters, based on the prediction parameters input from the coding parameter determination unit 110. The parameter coder 112 includes a partly identical configuration to a configuration in which the inter prediction parameter decoder 303 derives inter prediction parameters.

Figure 19:
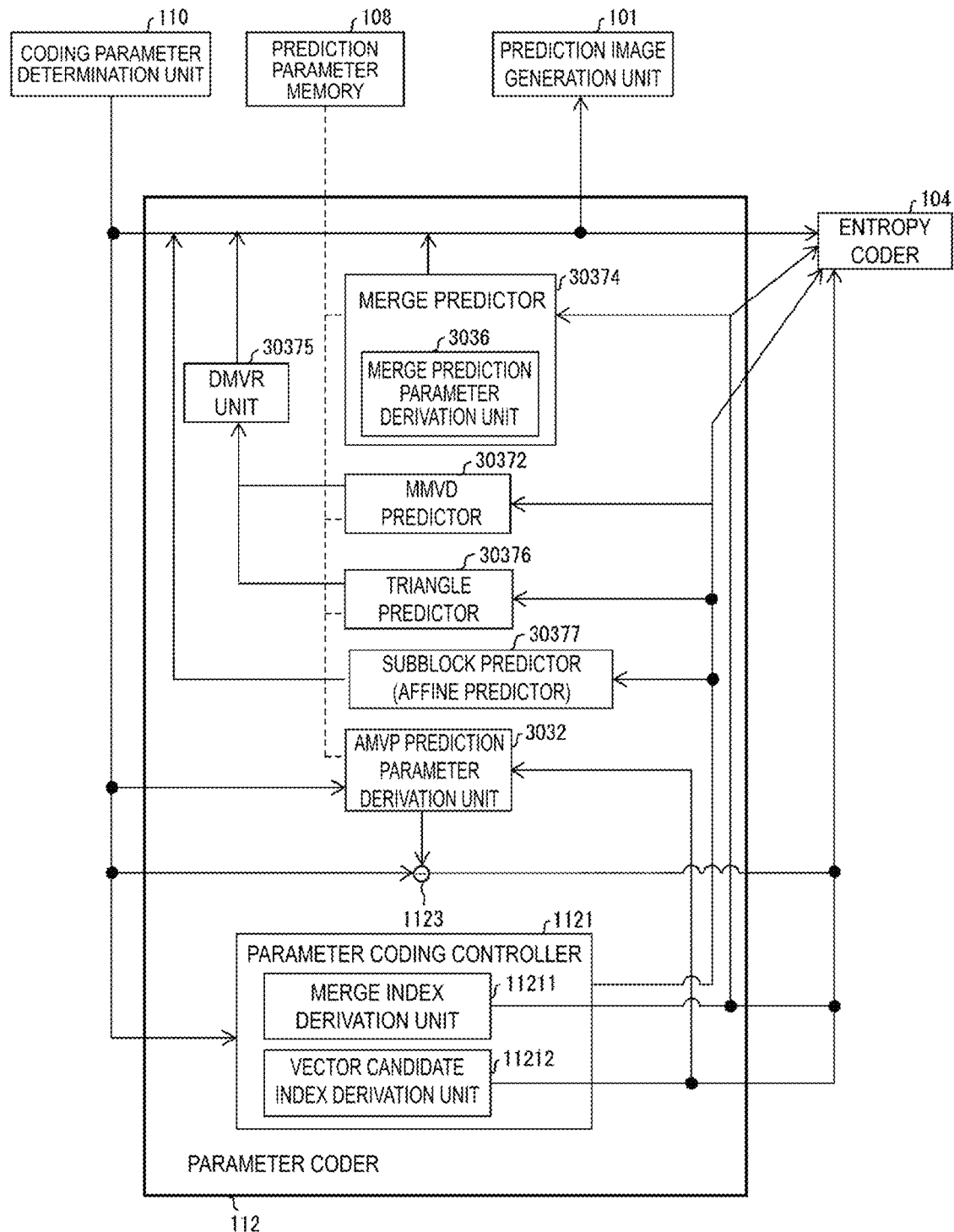
FIG. 19 is a schematic diagram illustrating a configuration of a parameter coder.

FIG. 19 is a schematic diagram illustrating a configuration of the parameter coder 112. The configuration of the parameter coder 112 will be described. As illustrated in FIG. 19, the parameter coder 112 includes a parameter coding controller 1121, a merge predictor 30374, a subblock predictor (affine predictor) 30372, a DMVR unit 30375, an MMVD predictor 30376, a Triangle predictor 30377, an AMVP prediction parameter derivation unit 3032, and a subtraction unit 1123. The merge predictor 30374 includes the merge prediction parameter derivation unit 3036. The parameter coding controller 1121 includes a merge index derivation unit 11211 and a vector candidate index derivation unit 11212. The parameter coding controller 1121 derives merge_idx, affine_flag, base_candidate_idx, distance_idx, direction_idx, etc. in the merge index derivation unit 11211, and derives mvpLX and the like from the vector candidate index derivation unit 11212. The merge prediction parameter derivation unit 3036, the AMVP prediction parameter derivation unit 3032, the affine predictor 30372, the MMVD predictor 30376, and the Triangle predictor 30377 may be collectively referred to as a motion vector derivation unit (motion vector derivation apparatus). The parameter coder 112 outputs the motion vector mvLX, the reference picture index refIdxLX, the inter prediction indicator inter_pred_idc, or information indicating these, to the prediction image generation unit 101. The parameter coder 112 outputs merge_flag, skip_flag, merge_idx, inter_pred_idc, refIdxLX, mvp_1X_idx, mvdLX, amvr_mode, and affine_flag to the entropy coder 104.

Figure 20:
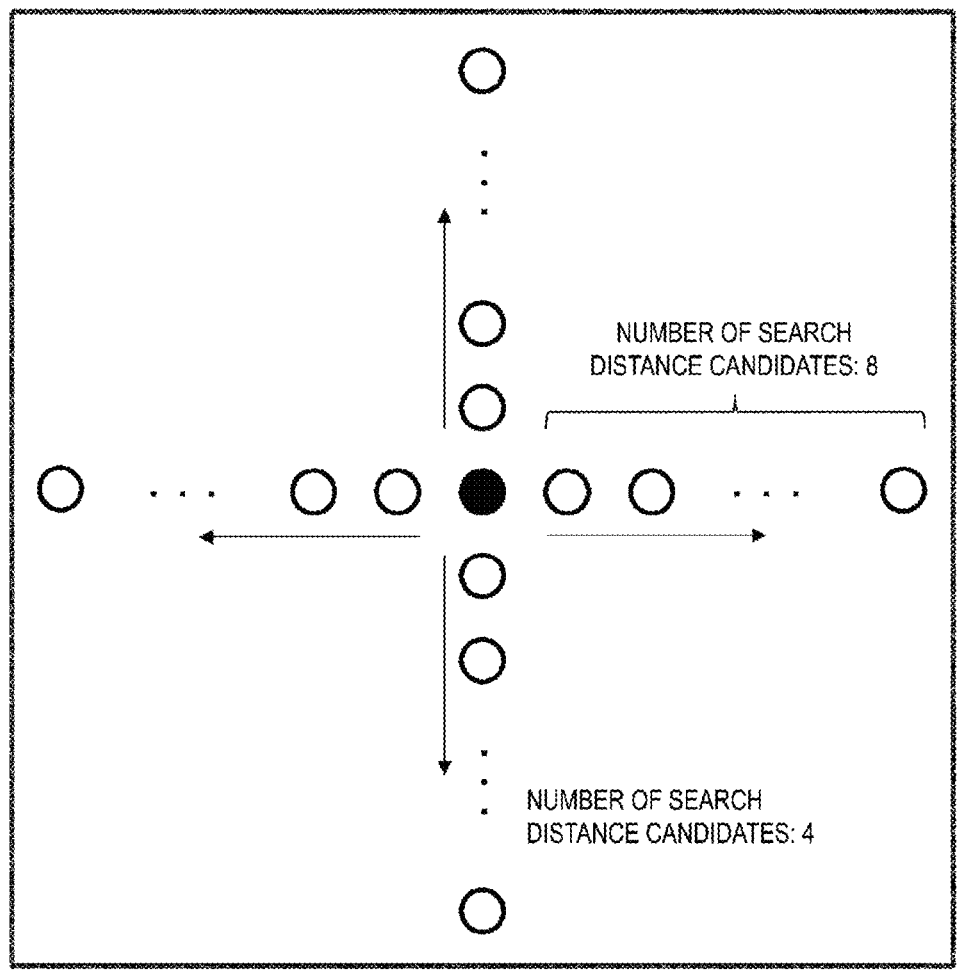
FIG. 20 is a diagram illustrating an example of the number of candidates for a search distance and the number of candidates for a derivation direction in the video coding apparatus.

FIG. 20 is a diagram illustrating an example of the number of candidates for a search distance and the number of candidates for a derivation direction in the video coding apparatus 11. The parameter coding controller 1121 derives parameters (base_candidate_idx, distance_idx, direction_idx, and the like) that represent the difference vector, and outputs the parameters to the MMVD predictor 30376. With reference to FIG. 20, difference vector derivation in the parameter coding controller 1121 will be described. A central solid circle in the figure is a location indicated by the prediction vector mvpLX, and searches for eight search distances around the location in four (up, down, left, right) directions. mvpLX is the motion vectors of the leading and second candidates in the merge candidate list, and each of the motion vectors is searched for. Two prediction vectors are present in the merge candidate list (first and second prediction vectors in the list), and eight search distances and four search directions are present, and thus mvdLX involves 64 candidates. One of the candidates mvdLX searched for that involves the lowest cost is represented by base_candidate_idx, distance_idx, and direction_idx.

In this manner, the MMVD mode is a mode in which limited candidate points around the prediction vector are searched for to derive the appropriate motion vector.

The merge index derivation unit 11211 derives the merge index merge_idx, and outputs it to the merge prediction parameter derivation unit 3036 (merge predictor). In the MMVD mode, the merge index derivation unit 11211 sets the value of the merge index merge_idx equal to the same value as the value of base_candidate_idx. The vector candidate index derivation unit 11212 derives the prediction vector index mvp_1X_idx.

The merge prediction parameter derivation unit 3036 derives the inter prediction parameter based on the merge index merge_idx.

The AMVP prediction parameter derivation unit 3032 derives the prediction vector mvpLX based on the motion vector mvLX. The AMVP prediction parameter derivation unit 3032 outputs the prediction vector mvpLX to the subtraction unit 1123. Note that the reference picture index refIdxLX and the prediction vector index mvp_1X_idx are output to the entropy coder 104.

The affine predictor 30372 derives an inter prediction parameter (affine prediction parameter) of a subblock.

The subtraction unit 1123 subtracts the prediction vector mvpLX, which is the output of the AMVP prediction parameter derivation unit 3032, from the motion vector mvLX input from the coding parameter determination unit 110, and generates the difference vector mvdLX. The difference vector mvdLX is output to the entropy coder 104.

The addition unit 106 adds a pixel value of the prediction image of the block input from the prediction image generation unit 101 and the prediction error input from the inverse quantization and inverse transformer 105 to each other for each pixel, and generates a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the multiple sets, an RD cost value indicating the magnitude of an amount of information and a coding error. The coding parameter determination unit 110 selects a set of coding parameters of which cost value calculated is a minimum value. In this manner, the entropy coder 104 outputs a set of selected coding parameters as the coding stream Te. The coding parameter determination unit 110 stores the determined coding parameters in the prediction parameter memory 108.

Note that some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transformer 311, the addition unit 312, the prediction image generation unit 101, the subtraction unit 102, the transform and quantization unit 103, the entropy coder 104, the inverse quantization and inverse transformer 105, the loop filter 107, the coding parameter determination unit 110, and the parameter coder 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, a part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiment and various amendments can be made to a design that fall within the scope that does not depart from the gist of the present invention.

APPLICATION EXAMPLES

The above-mentioned video coding apparatus 11 and the video decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

At first, referring to FIG. 2, it will be described that the above-mentioned video coding apparatus 11 and the video decoding apparatus 31 can be utilized for transmission and reception of videos.

Figure 2:
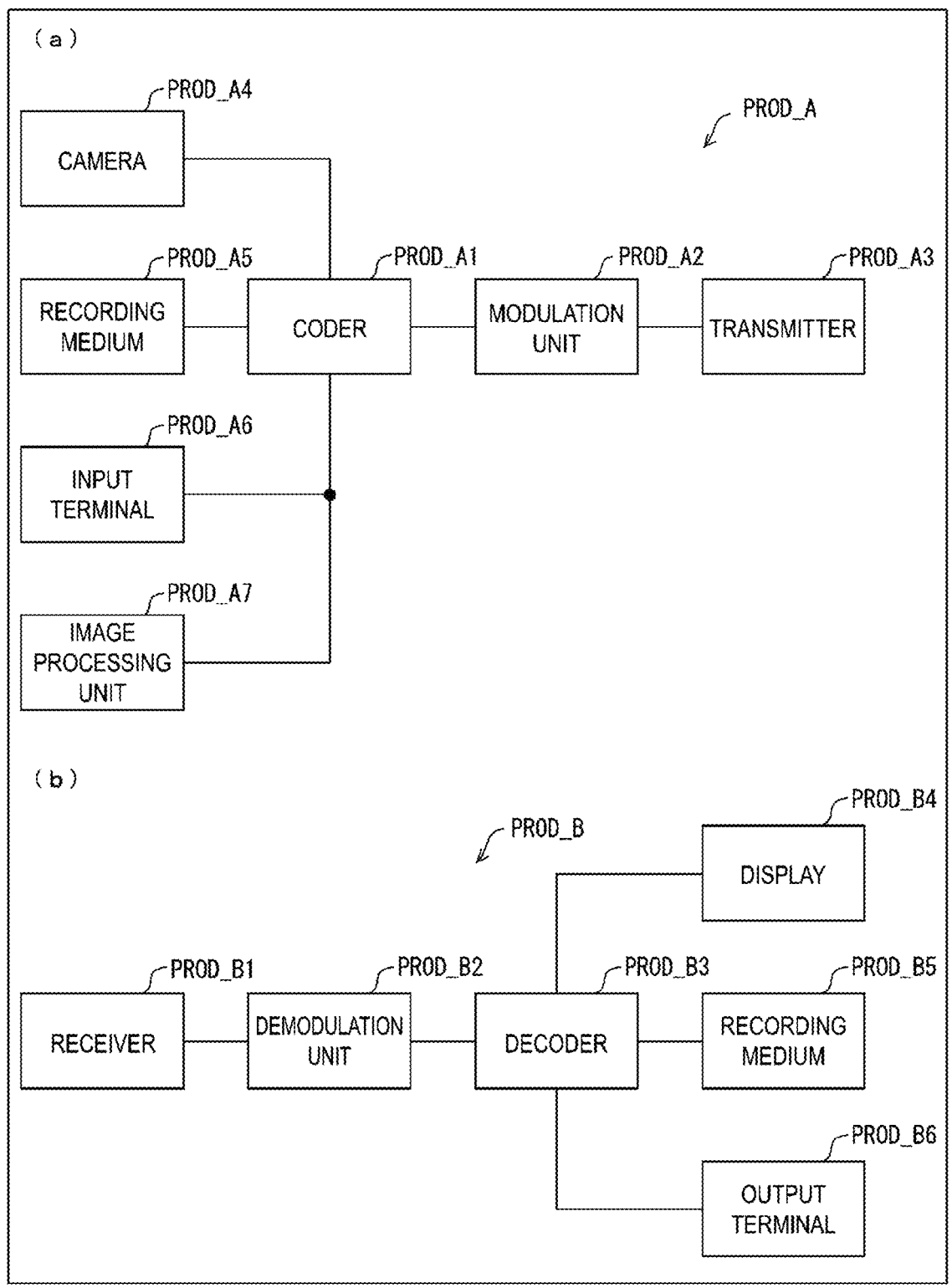
FIG. 2 is a diagram illustrating configurations of a transmitting apparatus equipped with a video coding apparatus and a receiving apparatus equipped with a video decoding apparatus according to the present embodiment. (a) thereof illustrates the transmitting apparatus equipped with the video coding apparatus, and (b) thereof illustrates the receiving apparatus equipped with the video decoding apparatus.

FIG. 2(*a*) is a block diagram illustrating a configuration of a transmitting apparatus PROD_A installed with the video coding apparatus 11. As illustrated in FIG. 2(*a*), the transmitting apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 that generates or processes images, as input sources of videos to be input into the coder PROD_A1. Although an example configuration in which the transmitting apparatus PROD_A includes all of the constituents is illustrated in the diagram, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

FIG. 2(*b*) is a block diagram illustrating a configuration of a receiving apparatus PROD_B installed with the video decoding apparatus 31. As illustrated in the diagram, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as output destinations of the videos to be output by the decoder PROD_B3. Although an example configuration that the receiving apparatus PROD_B includes all of the constituents is illustrated in the diagram, some of the constituents may be omitted.

Note that the recording medium PROD_B5 may record videos which are not coded, or may record videos which are coded in a coding scheme for recording different from a coding scheme for transmission. In the latter case, a coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Figure 3:
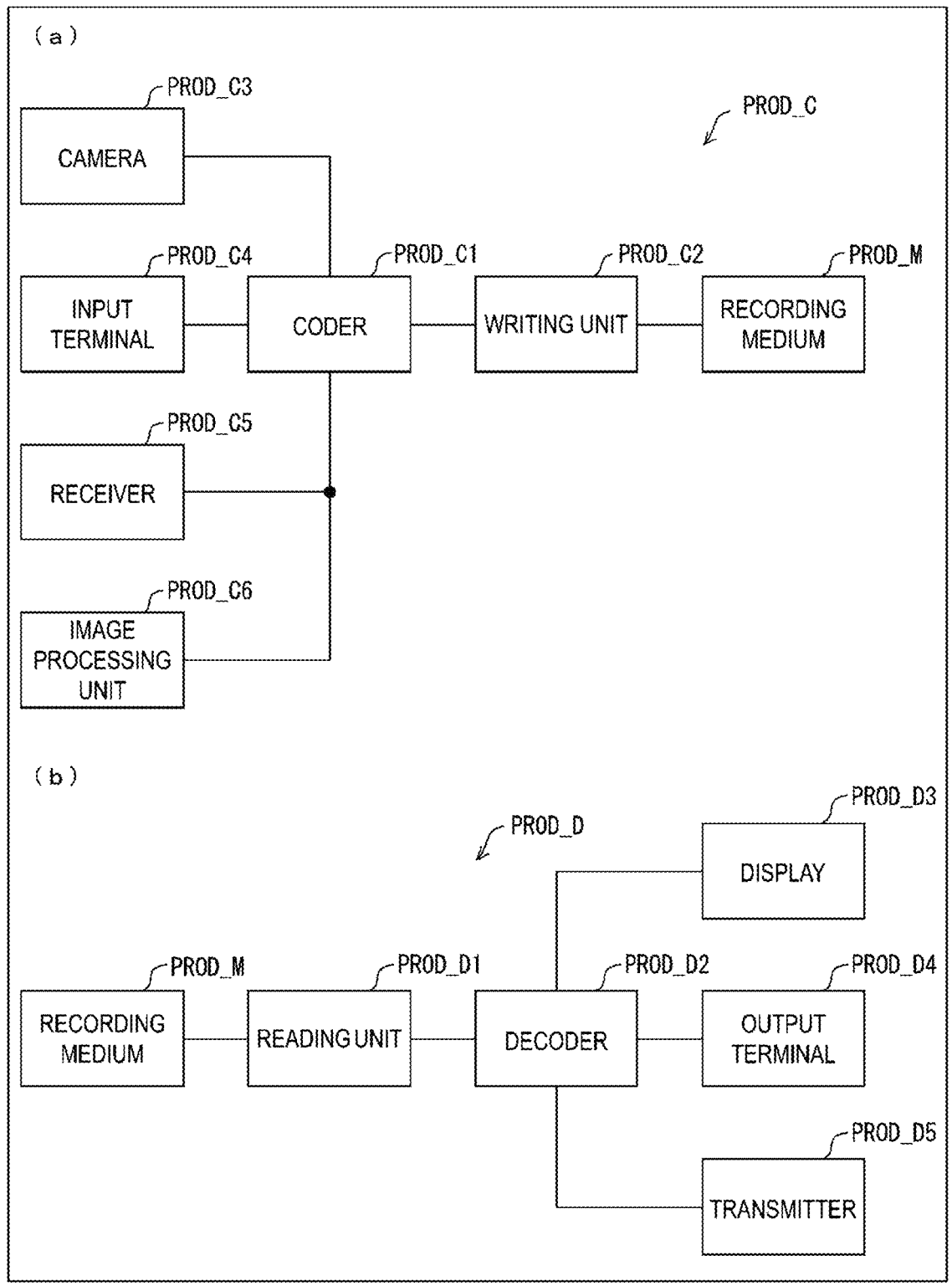
FIG. 3 is a diagram illustrating configurations of a recording apparatus equipped with the video coding apparatus and a reconstruction apparatus equipped with the video decoding apparatus according to the present embodiment. (a) thereof illustrates the recording apparatus equipped with the video coding apparatus, and (b) thereof illustrates the reconstruction apparatus equipped with the video decoding apparatus.

Next, referring to FIG. 3, it will be described that the above-mentioned video coding apparatus 11 and the video decoding apparatus 31 can be utilized for recording and regeneration of videos.

FIG. 3(a) is a block diagram illustrating a configuration of a recording apparatus PROD_C installed with the above-mentioned video coding apparatus 11. As illustrated in FIG. 3(a), the recording apparatus PROD_C includes a coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as input sources of the video input into the coder PROD_C1. Although an example configuration that the recording apparatus PROD_C includes all of the constituents is illustrated in the diagram, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main input source of videos). In addition, a camcorder (in this case, the camera PROD_C3 is the main input source of videos), a personal computer (in this case, the receiver PROD_C5 or the image processing unit C6 is the main input source of videos), a smartphone (in this case, the camera PROD_C3 or the receiver PROD_C5 is the main input source of videos), or the like is an example of the recording apparatus PROD_C as well.

FIG. 3(b) is a block illustrating a configuration of a reconstruction apparatus PROD_D installed with the above-mentioned video decoding apparatus 31. As illustrated in the diagram, the reconstruction apparatus PROD_D includes a reading unit PROD_D1 which reads coded data written in the recording medium PROD_M, and a decoder PROD_D2 which obtains a video by decoding the coded data read by the reading unit PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the output destinations of the video to be output by the decoder PROD_D2. Although an example configuration that the reconstruction apparatus PROD_D includes all of the constituents is illustrated in the diagram, some of the constituents may be omitted.

Note that the transmitter PROD_D5 may transmit a video which is not coded or may transmit coded data coded in the coding scheme for transmission different from a coding scheme for recording. In the latter case, a coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver and the like are connected is the main output destination of videos). In addition, a television receiver (in this case, the display PROD_D3 is the main output destination of videos), a digital signage (also referred to as an electronic signboard or an electronic bulletin board, and the like, and the display PROD_D3 or the transmitter PROD_D5 is the main output destination of videos), a desktop PC (in this case, the output terminal PROD_D4 or the transmitter PROD_D5 is the main output destination of videos), a laptop or tablet PC (in this case, the display PROD_D3 or the transmitter PROD_D5 is the main output destination of videos), a smartphone (in this case, the display PROD_D3 or the transmitter PROD_D5 is the main output destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each apparatus includes a CPU performing a command of a program to implement each function, a Read Only Memory (ROM) stored in the program, a Random Access Memory (RAM) developing the program, and a storage apparatus (recording medium) such as a memory storing the program and various data, and the like. In addition, an objective of the embodiment of the present invention can be achieved by supplying, to each of the apparatuses, the recording medium that records, in a computer readable form, program codes of a control program (executable program, intermediate code program, source program) of each of the apparatuses that is software for realizing the above-described functions and by reading and performing, by the computer (or a CPU or an MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc(DVD: trade name)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiment of the present invention can be also realized in the form of computer data signals embedded in a carrier such that the transmission of the program codes is embodied in electronic transmission.

The embodiment of the present invention is not limited to the above-described embodiment, and various modifications are possible within the scope of the claims. That is, an embodiment obtained by combining technical means modified appropriately within the scope defined by claims is included in the technical scope of the present invention as well.

CROSS-REFERENCE OF RELATED APPLICATION

This application claims the benefit of priority to JP 2019-043097 filed on Mar. 8, 2018, which is incorporated herein by reference in its entirety.

INDUSTRIAL APPLICABILITY

The embodiments of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

REFERENCE SIGNS LIST

31 Image decoding apparatus
301 Entropy decoder
302 Parameter decoder
3020 Header decoder
303 Inter prediction parameter decoder
304 Intra prediction parameter decoder
308 Prediction image generation unit
309 Inter prediction image generation unit
310 Intra prediction image generation unit
311 Inverse quantization and inverse transformer
312 Addition unit
11 Image coding apparatus
101 Prediction image generation unit
102 Subtraction unit
103 Transform and quantization unit
104 Entropy coder
105 Inverse quantization and inverse transformer
107 Loop filter
110 Coding parameter determination unit
111 Parameter coder
112 Parameter coder
1110 Header coder
1111 CT information coder
1112 CU coder (prediction mode coder)
1114 TU coder
3091 Motion compensation unit
3095 Combining unit
30951 Combined Intra/inter combining unit
30952 Triangle combining unit
30953 OBMC unit
30954 Weighted predictor
30955 GBI unit 30956 BDOF unit
309561 L0, L1 prediction image generation unit
309562 Gradient image generation unit
309563 Correlation parameter calculation unit
309564 Motion compensation modified value derivation unit
309565 BDOF prediction image generation unit

The invention claimed is:

1. A video decoding apparatus for performing Decoder side Motion Vector Refinement (DMVR) processing by using motion vectors mvL0 and mvL1 and two reference pictures, the video decoding apparatus comprising:
a DMVR circuit configured to derive a dmvrFlag indicating whether or not the DMVR processing is performed, and perform the DMVR processing in a case that the dmvrFlag is TRUE,
wherein the DMVR circuit
sets the dmvrFlag based on whether or not a flag, which is a flag of SPS and is a flag indicating that the DMVR processing is possible, is On,
sets the dmvrFlag based on whether or not gbiIdx is 0, and
sets the dmvrFlag based on whether or not both a luma_weight_l0_flag[refIdxL0] and a luma_weight_l1_flag[refIdxL1] are FALSE,
wherein the gbiIdx is an index that indicates a weight coefficient used in a target block out of multiple weight coefficient candidates included in a table gbiWLut
the luma_weight_l0_flag[refIdxL0] specifies whether or not a first weight coefficient and a first offset for luminance for an L0 reference picture indicated by a reference picture index refIdxL0 are present, and
the luma_weight_l1_flag[refIdxL1] specifies whether or not a second weight coefficient and a second offset for luminance for an L1 reference picture indicated by a reference picture index refIdxL1 are present.

2. The video decoding apparatus according to claim 1, wherein the DMVR circuit sets the dmvrFlag based on whether or not a merge flag is TRUE, wherein the merge flag is a flag to identify whether or not prediction parameters are derived from neighboring blocks.

3. The video decoding apparatus according to claim 1, wherein the DMVR circuit sets the dmvrFlag based on whether or not a bi-directional prediction is performed.

4. The video decoding apparatus according to claim 1, wherein the DMVR circuit sets the dmvrFlag based on whether or not mmvd_flag is FALSE, wherein the mmvd_flag is a flag that indicates whether or not an MMVD (Merge with Motion Vector Difference) mode is used.

5. The video decoding apparatus according to claim 1, wherein the DMVR circuit sets the dmvrFlag based on whether or not the L0 reference picture and the L1 reference picture are in such a positional relationship of being interpolated at equal distances regarding a current picture.

6. The video decoding apparatus according to claim 1, wherein the DMVR circuit derives the dmvrFlag based on whether or not a size of a block is less than or equal to a specific value.

7. A video encoding apparatus for performing Decoder side Motion Vector Refinement (DMVR) processing by using motion vectors mvL0 and mvL1 and two reference pictures, the video encoding apparatus comprising:
a DMVR circuit configured to derive a dmvrFlag indicating whether or not the DMVR processing is performed, and perform the DMVR processing in a case that the dmvrFlag is TRUE,
wherein the DMVR circuit
sets the dmvrFlag based on whether or not a flag, which is a flag of SPS and is a flag indicating that the DMVR processing is possible, is On,
sets the dmvrFlag based on whether or not gbiIdx is 0, and
sets the dmvrFlag based on whether or not both a luma_weight_l0_flag[refIdxL0] and a luma_weight_l1_flag[refIdxL1] are FALSE,
wherein the gbiIdx is an index that indicates a weight coefficient used in a target block out of multiple weight coefficient candidates included in a table gbiWLut,
the luma_weight_l0_flag[refIdxL0] specifies whether or not a first weight coefficient and a first offset for luminance for an L0 reference picture indicated by a reference picture index refIdxL0 are present, and
the luma_weight_l1_flag[refIdxL1] specifies whether or not a second weight coefficient and a second offset for luminance for an L1 reference picture indicated by a reference picture index refIdxL1 are present.

8. A video decoding method for performing Decoder side Motion Vector Refinement (DMVR) processing by using motion vectors mvL0 and mvL1 and two reference pictures, the video decoding method comprising:
setting a dmvrFlag, which indicates whether or not the DMVR processing is performed, based on whether or not a flag, which is a flag of SPS and is a flag indicating that the DMVR processing is possible, is On;
setting the dmvrFlag based on whether or not gbiIdx is 0;
setting the dmvrFlag based on whether or not both a luma_weight_l0_flag[refIdxL0] and a luma_weight_l1_flag[refIdxL1], are FALSE; and
performing the DMVR processing in a case that the dmvrFlag is TRUE,
wherein the gbiIdx is an index that indicates a weight coefficient used in a target block out of multiple weight coefficient candidates included in a table gbiWLut,
the luma_weight_l0_flag[refIdxL0] specifies whether or not a first weight coefficient and a first offset for luminance for an L0 reference picture indicated by a reference picture index refIdxL0 are present, and
the luma_weight_l1_flag[refIdxL1] specifies whether or not a second weight coefficient and a second offset for luminance for an L1 reference picture indicated by a reference picture index refIdxL1 are present.

* * * * *